US008573500B2

(12) United States Patent
Jennings et al.

(10) Patent No.: US 8,573,500 B2
(45) Date of Patent: Nov. 5, 2013

(54) DATA CARRIER SYSTEM HAVING A COMPACT FOOTPRINT AND METHODS OF MANUFACTURING THE SAME

(75) Inventors: Glen Eric Jennings, Savage, MN (US); William Stifle, Rogers, MN (US)

(73) Assignee: ATEK Products, LLC., Brainerd, MN (US)

( * ) Notice: Subject to any disclaimer, the term of this patent is extended or adjusted under 35 U.S.C. 154(b) by 21 days.

(21) Appl. No.: 13/145,581

(22) PCT Filed: Jan. 29, 2010

(86) PCT No.: PCT/US2010/022651

§ 371 (c)(1), (2), (4) Date: Jul. 21, 2011

(87) PCT Pub. No.: WO2010/088556

PCT Pub. Date: Aug. 5, 2010

(65) Prior Publication Data

US 2011/0272463 A1 Nov. 10, 2011

Related U.S. Application Data

(60) Provisional application No. 61/148,839, filed on Jan. 30, 2009.

(51) Int. Cl.

*G06K 7/00* (2006.01)
*G06K 19/06* (2006.01)
*G06K 7/06* (2006.01)
*G06K 7/04* (2006.01)

(52) U.S. Cl.

USPC ........... 235/486; 235/487; 235/492; 235/493; 235/435; 235/441; 235/453; 235/449

(58) Field of Classification Search

USPC ......... 235/486, 487, 492, 493, 435, 441, 453, 235/468

See application file for complete search history.

(56) References Cited

U.S. PATENT DOCUMENTS

| | | | |
|---|---|---|---|
| D59,194 | S | 10/1921 | Collins |
| 2,057,532 | A | 10/1936 | MacDonald |

(Continued)

FOREIGN PATENT DOCUMENTS

| | | |
|---|---|---|
| DE | 10 60 961 | 7/1959 |
| DE | 36 20 755 | 12/1987 |

(Continued)

OTHER PUBLICATIONS

Advanced Portable Information Products, *Datakey Brochure*, 1999.

(Continued)

*Primary Examiner* — Daniel Walsh
(74) *Attorney, Agent, or Firm* — Dorsey & Whitney LLP

(57) ABSTRACT

An electronic token system including a token receptacle and a portable token. The token receptacle includes a receptacle body with an outer surface having a first, generally planar array of electrical contacts, which are arranged in a dense-packed configuration that minimizes the surface area occupied by the planar array, consistent with sufficient electrical separation between adjacent contacts. The token receptacle also includes a first alignment feature and a first retention feature. The portable token includes an enclosure for enclosing at least a portion of the receptacle body, the enclosure having a second alignment feature for mating engagement with the first alignment feature and a second retention feature for holding the portable token in removable connection with the first retention feature. The token also includes a second, generally planar array of electrical contacts for electrical communication with the corresponding electrical contacts of the first planar array mounted in the token receptacle.

22 Claims, 10 Drawing Sheets

(56) References Cited

U.S. PATENT DOCUMENTS

| | | | | | |
|---|---|---|---|---|---|
| 2,176,253 | A | | 10/1939 | Fogarty | |
| 2,312,204 | A | | 2/1943 | Weindel, Jr. | |
| D140,669 | S | | 3/1945 | Moore | |
| D161,490 | S | | 1/1951 | Moore | |
| 2,540,718 | A | | 2/1951 | Duskin | |
| 3,001,167 | A | * | 9/1961 | Chesnutt et al. | 439/312 |
| 3,122,996 | A | | 3/1964 | Heatwole | |
| 3,222,534 | A | | 12/1965 | Scott | |
| 3,500,326 | A | | 3/1970 | Benford | |
| 3,544,769 | A | | 12/1970 | Hedin | |
| 3,641,315 | A | | 2/1972 | Nagata et al. | |
| 3,641,498 | A | * | 2/1972 | Hedin | 235/487 |
| 3,644,745 | A | | 2/1972 | Bell | |
| 3,648,020 | A | | 3/1972 | Tateisi | |
| 3,651,464 | A | * | 3/1972 | Hedin et al. | 235/487 |
| 3,657,496 | A | | 4/1972 | Davidson | |
| 3,660,831 | A | * | 5/1972 | Nicola et al. | 340/542 |
| 3,663,774 | A | | 5/1972 | Feder | |
| 3,673,467 | A | | 6/1972 | Eisenreich | |
| 3,678,250 | A | | 7/1972 | Dethloff et al. | |
| 3,686,659 | A | | 8/1972 | Bostrom | |
| 3,694,810 | A | | 9/1972 | Mullens et al. | |
| 3,702,464 | A | | 11/1972 | Castrucci | |
| 3,754,214 | A | | 8/1973 | Matsumoto et al. | |
| 3,757,305 | A | | 9/1973 | Hedin | |
| 3,761,892 | A | | 9/1973 | Bosnyak et al. | |
| 3,782,148 | A | | 1/1974 | Goldman | |
| 3,806,882 | A | | 4/1974 | Clarke | |
| 3,842,629 | A | | 10/1974 | Pazer et al. | |
| 3,848,229 | A | | 11/1974 | Perron et al. | |
| 3,859,634 | A | | 1/1975 | Perron et al. | |
| 3,889,501 | A | | 6/1975 | Fort | |
| 3,928,750 | A | | 12/1975 | Wolflingseder | |
| 3,971,916 | A | | 7/1976 | Moreno | |
| 4,023,161 | A | | 5/1977 | Sasaki | |
| 4,050,063 | A | | 9/1977 | Schull | |
| 4,085,394 | A | | 4/1978 | Weisenburger | |
| 4,176,782 | A | * | 12/1979 | Fukuda et al. | 235/449 |
| 4,211,919 | A | | 7/1980 | Ugon | |
| 4,225,758 | A | | 9/1980 | Konou et al. | |
| 4,297,569 | A | * | 10/1981 | Flies | 235/443 |
| 4,317,957 | A | | 3/1982 | Sendrow | |
| 4,326,125 | A | * | 4/1982 | Flies | 340/5.65 |
| D265,049 | S | | 6/1982 | Flies | |
| 4,333,328 | A | | 6/1982 | Platt | |
| 4,355,856 | A | | 10/1982 | Porter | |
| 4,379,966 | A | | 4/1983 | Flies | |
| 4,420,794 | A | | 12/1983 | Anderson | |
| 4,432,218 | A | | 2/1984 | Hoener | |
| 4,436,993 | A | | 3/1984 | Files | |
| 4,448,466 | A | | 5/1984 | Porter | |
| D274,126 | S | | 6/1984 | Flies | |
| 4,461,525 | A | | 7/1984 | Griffin | |
| 4,463,218 | A | | 7/1984 | Suzuki | |
| 4,466,680 | A | | 8/1984 | Sakai et al. | |
| D278,836 | S | | 5/1985 | Flies | |
| 4,522,456 | A | | 6/1985 | Wehrmacher | |
| D279,586 | S | | 7/1985 | Flies | |
| 4,549,076 | A | | 10/1985 | Flies | |
| 4,572,679 | A | | 2/1986 | Dorr | |
| 4,578,573 | A | * | 3/1986 | Flies et al. | 235/492 |
| 4,620,088 | A | | 10/1986 | Flies | |
| 4,631,943 | A | | 12/1986 | Hoener | |
| 4,659,915 | A | | 4/1987 | Flies et al. | |
| 4,663,952 | A | | 5/1987 | Gelhard | |
| D291,897 | S | | 9/1987 | Files | |
| 4,752,679 | A | | 6/1988 | Wehrmacher | |
| 4,791,257 | A | | 12/1988 | Frey et al. | |
| D302,238 | S | | 7/1989 | Kopu | |
| 4,924,686 | A | | 5/1990 | Vonlanthen | |
| 4,943,708 | A | | 7/1990 | Simmons et al. | |
| 4,947,662 | A | * | 8/1990 | Imedio | 70/395 |
| D321,691 | S | | 11/1991 | Brenda et al. | |
| D322,387 | S | | 12/1991 | Bailey | |
| 5,073,703 | A | | 12/1991 | Wehrmacher | |
| 5,157,244 | A | * | 10/1992 | Mroczkowski et al. | 235/441 |
| D332,045 | S | * | 12/1992 | Moore | D8/347 |
| 5,186,031 | A | | 2/1993 | Janssen et al. | |
| 5,195,341 | A | | 3/1993 | Nieuwkoop | |
| 5,204,663 | A | | 4/1993 | Lee | |
| 5,109,972 | A | | 6/1993 | Van Horn et al. | |
| 5,250,986 | A | | 10/1993 | Axten et al. | |
| D345,686 | S | | 4/1994 | Boehner | |
| 5,337,588 | A | | 8/1994 | Chhatwal | |
| 5,422,634 | A | | 6/1995 | Okubo | |
| 5,432,510 | A | | 7/1995 | Matthews | |
| 5,469,727 | A | * | 11/1995 | Spahn et al. | 70/278.3 |
| 5,507,162 | A | | 4/1996 | Chhatwal | |
| 5,526,662 | A | | 6/1996 | Diekhoff et al. | |
| 5,561,430 | A | | 10/1996 | Knebelkamp | |
| D375,299 | S | | 11/1996 | Fekete et al. | |
| 5,625,349 | A | | 4/1997 | Disbrow et al. | |
| 5,632,168 | A | | 5/1997 | Yano | |
| 5,685,182 | A | | 11/1997 | Chhatwal | |
| D388,722 | S | | 1/1998 | Wilson | |
| 5,758,529 | A | | 6/1998 | Chhatwal | |
| 5,831,520 | A | | 11/1998 | Stephan | |
| 5,831,827 | A | | 11/1998 | Fekete et al. | |
| 5,834,747 | A | | 11/1998 | Cooper | |
| 5,836,187 | A | | 11/1998 | Janssen et al. | |
| 5,841,637 | A | | 11/1998 | Chhatwal | |
| 5,905,446 | A | * | 5/1999 | Benore et al. | 340/5.7 |
| 5,923,264 | A | | 7/1999 | Lavelle et al. | |
| 5,949,047 | A | * | 9/1999 | Abe et al. | 235/435 |
| 6,000,258 | A | | 12/1999 | Lesko | |
| 6,035,677 | A | | 3/2000 | Janssen et al. | |
| 6,078,265 | A | | 6/2000 | Bonder et al. | |
| 6,092,404 | A | | 7/2000 | Chhatwal | |
| 6,218,955 | B1 | | 4/2001 | Conklin | |
| 6,227,019 | B1 | | 5/2001 | Chhatwal | |
| 6,296,190 | B1 | | 10/2001 | Randleman | |
| 6,354,122 | B1 | | 3/2002 | Snoke | |
| 6,384,709 | B2 | | 5/2002 | Mellen et al. | |
| D460,012 | S | | 7/2002 | Prouix et al. | |
| 6,414,586 | B1 | | 7/2002 | Yoshizawa | |
| 6,425,084 | B1 | | 7/2002 | Rallis et al. | |
| 6,486,793 | B1 | | 11/2002 | Buccola | |
| 6,600,406 | B1 | * | 7/2003 | Ha | 340/5.2 |
| 6,604,087 | B1 | | 8/2003 | Kolls | |
| D502,418 | S | | 3/2005 | Copen | |
| D512,060 | S | | 11/2005 | Wang et al. | |
| D518,030 | S | | 3/2006 | Lin | |
| D519,099 | S | | 4/2006 | Liu et al. | |
| 7,109,863 | B2 | | 9/2006 | Morrison | |
| D532,783 | S | | 11/2006 | Yu | |
| D534,414 | S | | 1/2007 | Stifle et al. | |
| 7,158,008 | B2 | | 1/2007 | Waring et al. | |
| D540,749 | S | | 4/2007 | Kaule | |
| D551,215 | S | | 9/2007 | Lee et al. | |
| D552,613 | S | | 10/2007 | Tan | |
| D557,588 | S | | 12/2007 | Stifle et al. | |
| D559,249 | S | | 1/2008 | Takei et al. | |
| 7,407,390 | B1 | | 8/2008 | Ni | |
| D587,719 | S | * | 3/2009 | Tate et al. | D14/480.1 |
| D594,871 | S | | 6/2009 | Ma | |
| D599,795 | S | | 9/2009 | Lindley | |
| 7,597,250 | B2 | | 10/2009 | Finn | |
| D603,601 | S | | 11/2009 | Ohta et al. | |
| D626,022 | S | | 10/2010 | Sayegh et al. | |
| D626,963 | S | | 11/2010 | Kim | |
| 2002/0025062 | A1 | * | 2/2002 | Black | 382/116 |
| 2002/0163472 | A1 | * | 11/2002 | Kasuya et al. | 343/702 |
| 2003/0184432 | A1 | * | 10/2003 | Waring et al. | 340/5.66 |
| 2003/0195585 | A1 | | 10/2003 | Gruzdowich et al. | |
| 2004/0027236 | A1 | * | 2/2004 | Zhai | 340/5.6 |
| 2004/0082213 | A1 | * | 4/2004 | Felps | 439/332 |
| 2004/0115994 | A1 | * | 6/2004 | Wulff et al. | 439/700 |
| 2004/0246142 | A1 | | 12/2004 | Hall et al. | |
| 2006/0186990 | A1 | | 8/2006 | Yamamoto et al. | |
| 2006/0219776 | A1 | | 10/2006 | Finn | |
| 2006/0246784 | A1 | | 11/2006 | Aekins et al. | |
| 2006/0279941 | A1 | * | 12/2006 | Akita et al. | 361/771 |
| 2007/0072461 | A1 | * | 3/2007 | Williams et al. | 439/144 |
| 2008/0009161 | A1 | * | 1/2008 | Sun et al. | 439/141 |

(56) References Cited

U.S. PATENT DOCUMENTS

| | | | | |
|---|---|---|---|---|
| 2008/0045052 | A1* | 2/2008 | Coteus et al. | 439/79 |
| 2008/0074235 | A1* | 3/2008 | Wong et al. | 340/5.22 |
| 2008/0085615 | A1* | 4/2008 | Xie et al. | 439/71 |
| 2008/0085633 | A1* | 4/2008 | Dawiedczyk et al. | 439/583 |
| 2008/0160792 | A1* | 7/2008 | Li et al. | 439/62 |
| 2008/0304712 | A1 | 12/2008 | Rowe et al. | |
| 2010/0193583 | A1 | 8/2010 | Tartavull et al. | |
| 2010/0264218 | A1* | 10/2010 | Daniels et al. | 235/441 |
| 2010/0281209 | A1* | 11/2010 | Ni et al. | 711/103 |
| 2011/0289986 | A1* | 12/2011 | Zhai et al. | 70/58 |

FOREIGN PATENT DOCUMENTS

| | | | |
|---|---|---|---|
| DE | 43 30 017 | | 3/1995 |
| EP | 0 367 433 | A1 | 5/1990 |
| EP | 0 793 188 | | 9/1997 |
| EP | 1 213 417 | | 6/2002 |
| FR | 1 321 529 | | 2/1962 |
| FR | 2 146 802 | | 3/1973 |
| FR | 2363837 | | 3/1978 |
| FR | 2 654 556 | | 5/1991 |
| FR | 2 723 655 | | 2/1996 |
| FR | 2 775 373 | | 8/1999 |
| GB | 1 427 825 | | 3/1973 |
| GB | 2 073 808 | | 10/1981 |
| SU | 639056 | | 12/1978 |
| WO | WO 83/00976 | | 3/1983 |
| WO | WO 98/34218 | | 8/1998 |
| WO | WO 01/42598 | | 6/2001 |
| WO | WO 02/09311 | | 1/2002 |
| WO | WO 2009/012495 | | 1/2009 |
| WO | WO 2009/029864 | A1 | 3/2009 |

OTHER PUBLICATIONS

DataTic™ *Datakev Brochure*, 2000.
"2KBIT Read/Write with Anticollision Contactless Identification Device EM4056", *EM Microelectronic-Marin SA*, Informational Brochure, 13 pgs., 2001.
"Read Only Contactless Identification Device H4102", Swatch Group, 6 pgs., 2000.
"Read/Write Transponder Device Family", ATMEL Wireless & µC, 2 pgs., 2001.
"Read/Write IDIC Micromodule with 1 Kbit Memory T5552", ATMEL Wireles & µC, 12 pgs., May 1, 2001.
"Standard R/W/IDIC with Integrated Capacitance T554", ATMEL Wireless & µC, 19 pgs., Sep. 3, 2001.
"Multifunctional 330-bit Read/Write RF-Identification IC T557", ATMEL, 24 pgs., Dec. 11, 2001.
iDTAG, Gang Programmer for Datakey Key/Slim Modules (SPI, Microwire & IIC Bus), 6 pgs., Nov. 29, 2001.
DataKey Guardian "Marina Access Control", *Datakey Brochure*, (2 pgs.), Mar. 29, 2002.
DataKey QuikPay, DataKey Brochure (2 pgs.), Mar. 29, 2002.
Philps. Appendix RF Manual $6^{th}$ Edition, document order No. 9397 750 15125, May 2005.
Lubachevsky, Boris D. et al. "Dense Packings of Congruent Circles in Rectangles with a Variable Aspect Ratio," arXiv:math/0405148 (May 2004).
Lubachevsky, Boris D. et al. "Minimum Perimeter Rectangles That Enclose Congruent Non-Overlapping Circles," *Discrete Mathematics*, vol. 309, pp. 1947-1962 (2009).
Weisstein, Eric W. "Circle Packing," *Math World*—A Wolfram Web Resource, http://mathworld.wolfram.com/CirclePacking.html. [Retrieved on Jul. 9, 2011.] Retrieved from the Internet: <URL: http://mathworld.wolfram.com/CirclePacking.html>.

* cited by examiner

DATA CARRIER SYSTEM HAVING A COMPACT FOOTPRINT AND METHODS OF MANUFACTURING THE SAME

CROSS-REFERENCE TO RELATED APPLICATIONS

This application is a 371 national stage application of PCT Patent Application No. PCT/US2010/022651, filed Jan. 29, 2010, entitled "Data Carrier System Having a Compact Footprint," which claims priority to U.S. Provisional Application No. 61/148,839, filed Jan. 30, 2009, each of which is hereby incorporated by reference in its entirety.

FIELD OF THE INVENTION

The present disclosure relates generally to an electronic data carrier system. Particularly, the present disclosure relates to apparatus and methods for electronic data carriers and receptacles therefor. More particularly, the present disclosure relates to apparatus and methods for a data carrier system having a compact footprint, such as an on-mount electronic data carrier system, comprising a token and token receptacle.

BACKGROUND OF THE INVENTION

Electronic token data carrier systems have been used in many applications and have proven to be a source for portable information solutions. For example, electronic token systems have been used in data logging applications wherein a portable electrical/electronic token device stores user and/or other information for transport of data to/from a remote station; in access control applications where a portable token device stores information to be verified by an access control program or system; in cashless vending or cash token applications wherein a portable electrical/electronic token device stores a value (e.g., cash value or number of credits, etc.) that is decremented after, for example, vending a product, and can be recharged with additional value; and in security applications wherein a portable electrical/electronic token device stores personal identification information that is valid only when the electrical/electronic token device is being used by the owner or authorized personnel of the electrical/electronic token device.

Electronic token data carrier systems can typically involve a master circuit or electrical operating system of some kind, such as a computer system, activated by use of a portable token-like device which is combined with the electrical system, as by insertion into a suitable receptacle or the like, to make electrical contact or connection with the system. Prior electronic token data carrier systems include various embodiments of electrical/electronic token devices and electrical token receptacles disclosed in U.S. Pat. No. 4,752,679, entitled "RECEPTACLE DEVICE," issued on Jun. 21, 1988; U.S. Pat. No. 4,659,915, entitled "RECEPTACLE DESIGN FOR USE WITH ELECTRONIC KEY-LIKE DEVICE," issued on Apr. 21, 1987; U.S. Pat. No. 4,522,456, entitled "ELECTRONIC TAG RECEPTACLE AND READER," issued on Jun. 11, 1985; U.S. Pat. No. 4,620,088, entitled "RECEPTACLE DESIGN FOR USE WITH ELECTRONIC KEY-LIKE DEVICE," issued on Oct. 28, 1986; U.S. Design Pat. No. D345,686, entitled "ELECTRICAL INFORMATION KEY," issued on Apr. 5, 1994; U.S. Pat. No. 4,578,573, entitled "PORTABLE ELECTRONIC INFORMATION DEVICES AND METHOD OF MANUFACTURE," issued on Mar. 25, 1986; U.S. Pat. No. 4,549,076, entitled "ORIENTATION GUIDE ARRANGEMENT FOR ELECTRONIC KEY AND RECEPTACLE COMBINATION," issued on Oct. 22, 1985; U.S. Pat. No. 4,436,993, entitled "ELECTRONIC KEY," issued on Mar. 13, 1984; U.S. Pat. No. 5,073,703, entitled "APPARATUS FOR ENCODING ELECTRICAL IDENTIFICATION DEVICES BY MEANS OF SELECTIVELY FUSIBLE LINKS," issued on Dec. 17, 1991; U.S. Design Pat. No. D291,897, entitled "IDENTIFICATION TAG," issued on Sep. 15, 1987; U.S. Pat. No. 4,326,125, entitled "MICROELECTRONIC MEMORY KEY WITH RECEPTACLE AND SYSTEMS THEREFOR," issued on Apr. 20, 1982; U.S. Pat. No. 4,297,569, entitled "MICROELECTRONIC MEMORY KEY WITH RECEPTACLE AND SYSTEMS THEREFOR," issued on Oct. 27, 1981; U.S. patent application Ser. No. 12/177,016, entitled "RF TOKEN AND RECEPTACLE SYSTEM AND METHOD," filed Jul. 21, 2008; and International Patent Application No. PCT/US2008/074888, entitled "EDGE CONNECTOR DATA CARRIER SYSTEM AND METHOD," filed Aug. 29, 2008; all of which are assigned to Datakey Electronics, Inc., the assignee of the present application, and all of which are hereby incorporated herein by reference in their entirety.

The above-referenced electronic token data carrier systems disclose electrical/electronic token devices and receptacles. In general, a circuit or electrical operation system is activated by use of a portable token device that is inserted into a receptacle or the like to make electrical contact or connection with such circuit or electrical operation system. In the majority of the above-referenced systems, such electrical contact or connection is generally made by rotating the token device after the token is fully inserted into the receptacle, whereby a plurality of cantilever spring contacts or "bent metal" contacts of the receptacle mate with contacts of the token device. Electrical pathways or wires/traces in the receptacle electrically connect the cantilever spring contacts to an interface of the receptacle. The interface carries electrical signals between the token device and the circuit or electrical operation system.

The referenced prior art discloses electrical key-like devices in which a master circuit or electrical operating system of some kind, such as a computer system, is activated by use of a portable key-like device or token which is combined with the electrical system, as by insertion into a suitable receptacle or the like, to make electrical contact or connection with the system. The various embodiments described herein improve upon the typical electronic token data carrier systems, and particularly, improve upon electronic token data carrier systems and concepts by using on-mount electronic data carrier token devices and receptacles and methods related thereto.

There exists a need in the art for rugged electronic token data carrier systems with compact footprints.

BRIEF SUMMARY OF THE INVENTION

The present disclosure, in one embodiment, relates to an electronic token system for access control of a host device. The system includes a token receptacle for operably coupling with the host device and a portable token. The token receptacle includes a receptacle body with a volume and an outer surface, the outer surface having a first, generally planar array of electrical contacts mounted in the body. The contacts are arranged in a dense-packed configuration that minimizes the surface area occupied by the planar array, consistent with sufficient electrical separation between adjacent contacts. The token receptacle also includes a first alignment feature and a first retention feature within the volume of the receptacle body. The portable token includes an enclosure for enclosing at least a portion of the receptacle body, the enclosure having a second alignment feature for mating engagement with the first alignment feature and a second retention feature for holding the portable token in removable connection with the first retention feature of the token receptacle. The token also includes a second, generally planar array of electrical contacts mounted in the portable token for electrical communication with the corresponding electrical contacts of the first planar array mounted in the token receptacle when the first and second alignment features are in mating engagement. Additionally, the token has an electrical component activated by the token receptacle, with conductors for electrically connecting the electrical component to the second, generally planar array of electrical contacts mounted in the portable token, the electrical component being mounted within the enclosure and displaced either laterally or vertically or both from the second planar array.

The present disclosure, in another embodiment, relates to a portable electronic token for use with an access control system of a host device. The token includes an enclosure for enclosing at least a portion of a token receptacle of the access control system for operably coupling the portable token with the host device. The token receptacle includes a receptacle body with a volume and an outer surface, the outer surface having a first, generally planar array of electrical contacts mounted in the body, with the contacts arranged in a dense-packed configuration that minimizes the surface area occupied by the planar array, consistent with sufficient electrical separation between adjacent contacts. The token receptacle also includes a first alignment feature and a first retention feature within the volume of the receptacle body. The enclosure of the portable token includes a second alignment feature for mating engagement with the first alignment feature and a second retention feature for holding the portable token in removable connection with the first retention feature of the token receptacle. The enclosure of the token further includes a second, generally planar array of electrical contacts mounted in the portable token for electrical communication with the corresponding electrical contacts of the first planar array mounted in the token receptacle when the first and second alignment features are in mating engagement. The enclosure also includes an electrical component activated by the token receptacle, with conductors for electrically connecting the electrical component to the second, generally planar array of electrical contacts mounted in the portable token, the electrical component being mounted within the enclosure and displaced either laterally or vertically or both from the second planar array.

The present disclosure, in yet another embodiment, relates to a method of accessing a host device through an access control system. The method includes operably coupling a portable electronic token with a token receptacle operably coupled with the host device. The portable electronic token includes an enclosure having a first alignment feature and a first retention feature, a first, generally planar array of electrical contacts mounted in the portable token, and an electrical component with conductors for electrically connecting the electrical component to the second, generally planar array of electrical contacts mounted in the portable token, the electrical component being mounted within the enclosure and displaced either laterally or vertically or both from the first planar array. The token receptacle includes a receptacle body with a volume and an outer surface, the outer surface having a second, generally planar array of electrical contacts mounted in the body, with the contacts arranged in a dense-packed configuration that minimizes the surface area occupied by the planar array, consistent with sufficient electrical separation between adjacent contacts. The token receptacle further includes a second alignment feature and a second retention feature within the volume of the receptacle body. The token and the token receptacle are operably coupled such that the enclosure of the portable token encloses at least a portion of the receptacle body, with the first alignment feature matingly engaging with the second alignment feature and the first retention feature holding the portable token in removable connection with the second retention feature of the token receptacle. Furthermore, token and the token receptacle are operably coupled such that the first, generally planar array of electrical contacts mounted in the portable token are in electrical communication with the corresponding electrical contacts of the second, generally planar array of electrical contacts mounted in the token receptacle, and the electrical component is activated by the token receptacle.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the present invention, it is believed that the invention will be better understood from the following description taken in conjunction with the accompanying Figures, in which:

DETAILED DESCRIPTION

Figure 1A:
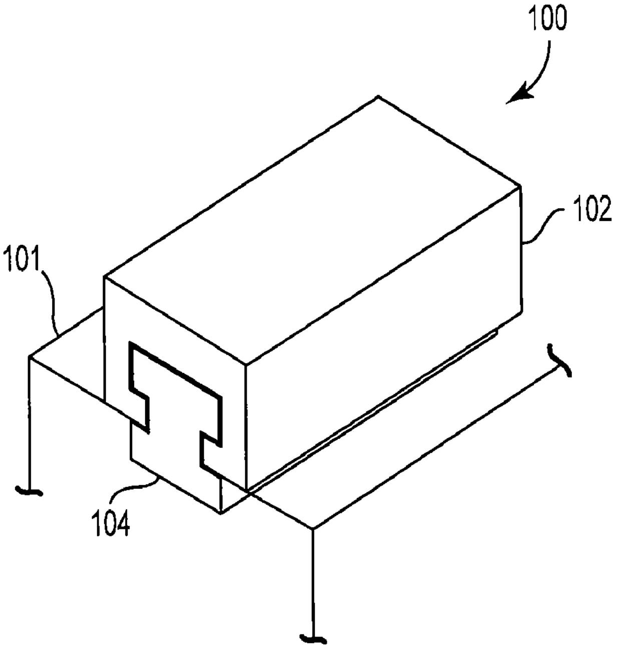
FIG. 1*a* is a perspective view of an electronic token data carrier system in accordance with one embodiment of the present disclosure, wherein the token is matingly engaged with the token receptacle.

The present disclosure relates generally to novel and advantageous electronic data carrier systems. Particularly, the present disclosure relates to novel and advantageous apparatus and methods for electronic data carriers and receptacles therefor. More particularly, the present disclosure relates to apparatus and methods for a data carrier system having a compact footprint, such as an on-mount electronic data carrier system, comprising a token and token receptacle. In one embodiment of the present disclosure, an electronic token data carrier system can include an electronic token and a self-contained, scalable, stand-alone electronic token receptacle, which can be operably coupled or integrated with a host device, and are operable in a plurality of access modes to allow access to the host device depending on a level of access allowance granted to the electronic token. The token receptacle, or a controller operably coupled thereto, may include a memory for storing data related to a plurality of electronic tokens and respective levels of access allowance and operation events of the electronic tokens. The token receptacle or controller may also be capable of receiving data from (e.g., updated by data transferred from) an electronic token and capable of downloading data to an electronic token.

Such electronic token data carrier systems may provide relatively large amounts of data bit storage with fast access time and in a very durable medium. They not only serve to store data and introduce it into a computer or other electrical control system, but may also provide portability for electronic circuit elements or dies, whether the purpose of the electrical circuit system into which the token is introduced is the storage of information or any other purpose, such as a control function.

The various embodiments of the present disclosure can be used in many applications, for example, with secure communications products that protect governmental communications/information. If the data carrier and the equipment it is configured to mate with and activate are maintained physically separated, there is potentially minimal, or no, security risk of discovery of the equipment's secure algorithms. Other exemplary applications where the various embodiments of the present disclosure can be used include, but are not limited to, a data logging application for transport of data to/from a remote station, for access control to electronic systems or to facilities, for carrying a cash value (e.g., cashless vending), and for crypto-ignition keys, or CIKs.

In a data logging operation, the system reads/writes information from/to the token, and the user transports data to/from a remote station via a token receptacle. In an access control operation, the system determines whether the token is one of the permitted, or allowed, tokens. If so, the system outputs a logic command, such as an administrator-specified length of access time, etc. This application can be used for locks and gates, etc. In a cashless vending operation, the system stores an amount of value (e.g., cash value, or number of credits, etc.) on the token and decrements the value on the token after each vending operation. Once the cash, credit, etc. is used up, additional cash, credits, etc. can be recharged onto the token in a similar operation. During a cashless vending operation, a user and/or the system may also activate a dispenser, open a control, and activate the control for a length of time.

It is appreciated that the electronic token systems of the present disclosure are not limited by the term "token" or its definition. The systems of the present disclosure may also be referred to as electronic lock or locking systems, data logging systems, cashless vending systems, data decrementing systems, data access control systems, CIK systems, etc.

One of the advantages of an electronic data carrier system of the present disclosure is that the system can be a self-contained, scalable unit and does not require a computer network. The receptacle unit can be easily installed onto a variety of host devices or at access points, such as gates, doors, or any other entrances, etc., allowing authorized users to take advantage of the re-programmable memory of the electronic tokens for accessing the host devices or facilities. Instead of using single or multiple, widespread security codes, users may carry a rugged, electronic data carrier, for example, on their key chain, to enter a facility or access a host device. Therefore, the system eliminates logistical and cost problems associated with distributing and changing access codes. The system can allow the control of token programming on a standard PC, thereby significantly reducing expenses when changes in the system need to be made.

The electronic data carrier systems of the present disclosure can be configured and arranged for rugged environments and harsh operating conditions, such as dirt, dust, rain, snow, ice, etc. In addition, the system can provide flexibility when creating access privileges for specific groups, dates, times, individual users, etc. Also, event transaction data can be exported from each controller to a PC, and reports can be generated in a variety of formats.

Figure 1B:
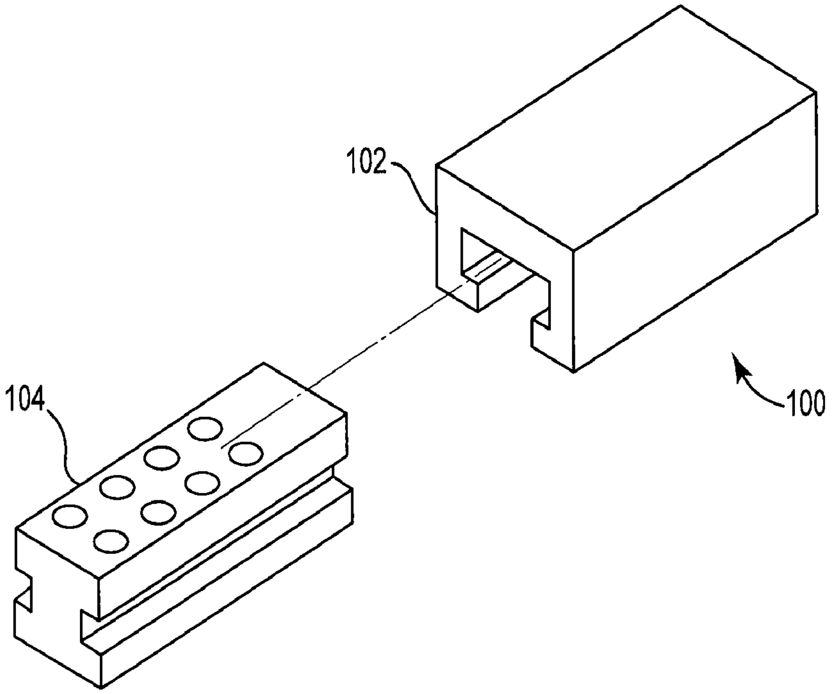
FIG. 1*b* is a perspective view of an electronic token data carrier system in accordance with one embodiment of the present disclosure, wherein the token is operably detached from the token receptacle.

FIGS. 1*a* and 1*b* illustrate one embodiment of an electronic token data carrier system 100, including an electronic data carrier, token, or token-like device 102 and a token receptacle 104. The token 102 can be portable and may be operably and removably coupled with the token receptacle 104. The token receptacle 104 may be operably coupled or integrated with a host device 101, and when token 102 is coupled with token receptacle 104 (e.g., see FIG. 1*a*), the token data carrier system 100 may be operable, in a plurality of access modes, to allow access to the host device 101 depending on a level of access allowance granted to the token 102. The token data carrier system 100 can be configured, as will be described in further detail, in such a manner to reduce and/or substantially minimize the footprint of the token receptacle 104 on the outer surface of the host device 101. Such a system may also be referred to herein as an "on-mount" system; however, it is appreciated that the electronic token systems of the present disclosure are not limited by the term "on-mount" or its definition. The systems of the present disclosure may include a variety of electronic token system configurations, including but not limited to on-mount, over-mount, snap-on, bayonet, twist on, slide on, friction fit, or any other suitable configuration in accordance with the various embodiments of the present disclosure.

As can be seen in FIG. 1*a*, when the token 102 is operably coupled to the receptacle 104 extending from the outer surface of the host device 101, the token 102, or portions of the token 102, may at least partially surround or cover at least a portion of the receptacle 104, such that the token 102 is generally mounted onto, over, or surrounding at least a portion of the receptacle 104. As such, many benefits and advantages, such as but not limited to the ones described herein, can be achieved using an electronic token data carrier system 100 according to the various embodiments of the present disclosure. For example, in FIG. 2*a*, one embodiment of an electronic token data carrier system 100 is illustrated along side an example "in-mount" data carrier system 200, wherein a token 202 is operably coupled to a token receptacle 204, by insertion of the token 202 into an opening of the receptacle 204. One assumption that can be made here is that the token 202 comprises the same token PCB, contacts, and circuit elements as the token 102, and can be made to be no larger in size than need be to include the necessary token components. Nonetheless, it can be seen that for an in-mount data carrier system 200, the receptacle 204 must be large enough to essentially surround the token 202. Thus, the token receptacle 204 is required to comprise an extra volume 206 of material and space (illustrated as dashed line), above that of electronic token data carrier system 100, thereby taking up valuable space, or real estate (particularly outer surface space), on or in an attached host device 201.

Figure 2A:
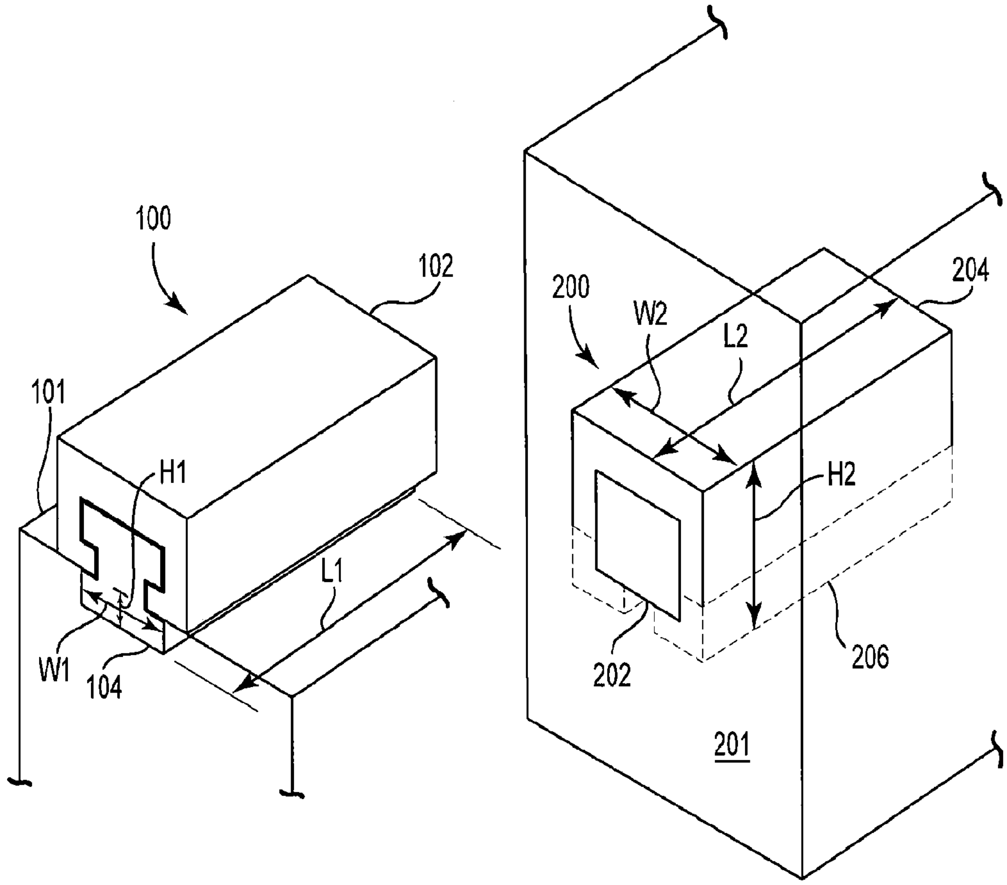
FIG. 2*a* is a perspective view of one embodiment of an electronic token data carrier system in accordance with one embodiment of the present disclosure illustrated along side a perspective view of an example "in-mount" data carrier system, wherein a token is operably coupled to a token receptacle by insertion of the token into an opening of the receptacle.
Figure 2B:
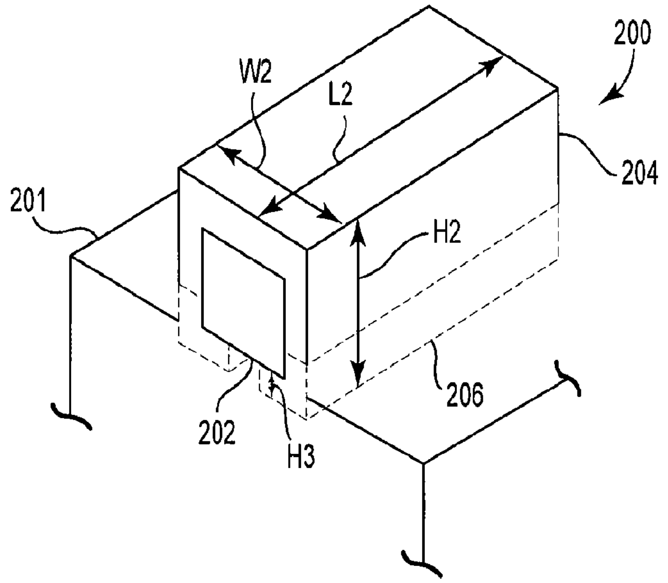
FIG. 2*b* is another perspective view of an example "in-mount" data carrier system, wherein a token is operably coupled to a token receptacle by insertion of the token into an opening of the receptacle.

Specifically, as can be seen in FIG. 2*a*, in one embodiment, electronic token data carrier system 100 takes up a volume of space in host device 101 equal to W1×L1×H1. In contrast, as can be seen in FIG. 2*a*, the example "in-mount" data carrier system 200 takes up a volume of space in host device 201 equal to W2×L2×H2, which is much larger than the volume of space taken up by system 100 when token 202 comprises the same token PCB, contacts, and circuit elements as the token 102. In an alternative example embodiment of "in-mount" data carrier system 200, the receptacle 204 may not be mounted entirely within the host device 201, but rather partially mounted in the host device 201, as illustrated in FIG. 2*b*. This reduces, somewhat, the volume within the host device 201 that the data carrier system occupies. Nonetheless, the example "in-mount" data carrier system 200 in FIG. 2*b* takes up a volume of space in host device 201 equal to W2×L2×H3, which is still significantly larger than the volume of space taken up by system 100 when token 202 comprises the same token PCB, contacts, and circuit elements as the token 102. In even further embodiments of electronic token data carrier system 100 and example "in-mount" data carrier system 200, wherein each are surface mounted to the respective host devices 101, 201, the system 100 would consume a surface area of the host device 101 equal to W1×L1, while system 200 would consume a surface area of the host device 201 equal to W2×L2, which is significantly larger than the surface area of space taken up by system 100 when token 202 comprises the same token PCB, contacts, and circuit elements as the token 102. In general, for any given electronic data carrier system circuit consisting of PCB, contacts, and circuit elements, an electronic data carrier system configuration according to the present disclosure will result in a smaller, or substantially smaller token receptacle footprint (volume or surface area on host device) than the exact same data carrier system circuit provided in an "in-mount" electronic data carrier system.

Thus, according to the various embodiments of an electronic data carrier system described herein, the token receptacle 104 may be configured to take up less space, volume, or real estate, on or in an attached host device 101. For example, because the token receptacle can be configured such that the token 102 is generally mounted onto, over, or at least partially surrounding the receptacle 104, the receptacle can be generally configured such that approximately only sufficient space for contacts may be provided, thereby reducing, and in some cases significantly reducing, the footprint size of the token receptacle 104. As stated above, space on a host device may be very valuable, particularly when a host device is miniaturized and/or when the data carrier system is competing for volume or outer surface space with other host device components, such as but not limited to, a keyboard or display. Thus, one advantage of the various embodiments of the present disclosure includes a reduced footprint size for the token receptacle 104, which can be attached or operably coupled with the host device 101.

Figure 3A:
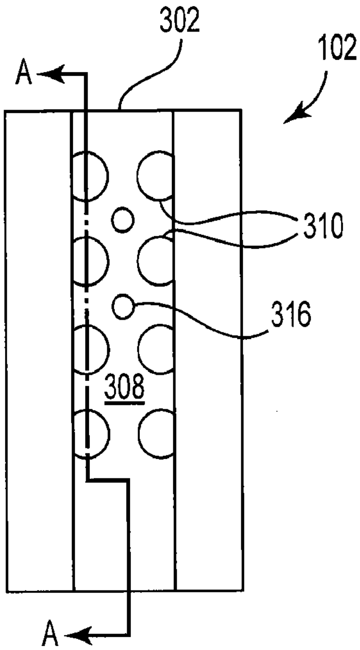
FIG. 3*a* is a plan view of a token in accordance with one embodiment of the present disclosure, illustrating the contact surface of the token.
Figure 3B:
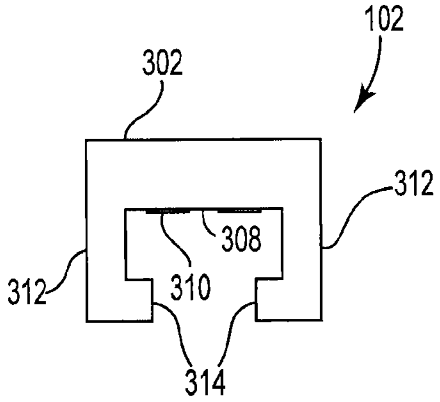
FIG. 3*b* is an end view of a token in accordance with one embodiment of the present disclosure.

As can be seen in detail in FIGS. 3*a* and 3*b*, a portable token device 102 may comprise a generally nonconductive enclosure 302 (which may also be thought of and referred to herein as the "body" of the token device 102). The enclosure 302 may be made of any suitable material providing rigidity to the token 102. In some embodiments, the enclosure 302 may be molded plastic (e.g., acrylonitrile butadiene styrene (ABS), nylon, polypropylene, polyethylene, polyvinyl chloride (PVC)) for increased strength, durability, and overall ruggedness. The embodiment of a token 102 illustrated in FIG. 3*b* is generally U-shaped, having one or more extensions 312, arms, wings, etc., extending from either side of the main plane of the token 102. Extensions 312 may each include a coupling arm 314 for reception by a mating coupling ledge or groove provided on the receptacle 104, which may be provided for alignment and/or retention when the token 102 is operably coupled to the receptacle 104. In other embodiments, other coupling and retention means may be utilized, including but not limited to snap-on, bayonet, twist on, slide on, friction fit, or any other suitable coupling means. For example, token 102 may include magnetic coupling means, such as magnetized elements 316 (FIG. 3*a*), in any suitable location for magnetically mating with corresponding magnetic coupling means provided on the token receptacle 104. In a further embodiment, the magnet within the token enclosure 302 may include a moldable material impregnated with magnetic particles to form at least one domain of a first magnetic polarity, and the magnet within the token receptacle enclosure may include a corresponding moldable material impregnated with magnetic particles to form at least one domain of a second magnetic polarity. Furthermore, the token 102 may be provided with any number or combination of alignment and/or retention features, and in some embodiments, the alignment and retention features may be the same physical component or feature, while in other embodiments, the alignment and retention features may be the separate physical components or features. As can be seen in FIGS. 1*a*, 1*b*, and 3*b*, the alignment and/or retention features may be generally concave with respect to the general body volume of the token receptacle 104.

It is appreciated that the token 102 can be configured and arranged to have many different shapes, such as flat, key-like, circular or semi-circular, cylindrical, polygonal, irregular, etc., and may be configured and arranged for many different uses, such as a user access device, an administrative key, a data transfer device, or any combination of uses, etc. The receptacle 104 can also be configured and arranged to have any suitable shape corresponding with the shape of the token 102, such that the receptacle 104 may removably receive and retain the token 102 in an operable position.

As discussed above, many benefits and advantages, such as but not limited to the ones described herein, can be achieved using an electronic token data carrier system 100 according to the various embodiments of the present disclosure. In one embodiment, because the token receptacle 104 can be attached or coupled with or within a host device 101, and in some embodiments permanently attached to or within a host device 101, the token receptacle 104 may not be as easy to repair or replace as a portable token 102 that can be removed from, or removably couple with, the token receptacle 104. Thus, it may be desirable to reduce or eliminate those portions of a token receptacle (see, e.g., portions 206) that are more susceptible to damage or breakage, thereby reducing the need for repairs to the token receptacle. For example, as shown in FIG. 2*a* by comparison to an example "in-mount" data carrier system, the extra volume 206 of material and space (illustrated as dashed line) on a token receptacle 204 of an "in-mount" system 200 may be eliminated in embodiments of an on-mount token receptacle 104 for an electronic data carrier system 100 described herein. Particularly, in one embodiment as can further be seen in FIG. 3*b*, portions of the token receptacle that would be more susceptible to damage or breakage, such as any extensions, arms, wings, etc., may be eliminated by moving those portions, such as the extensions 312 and/or coupling arms 314, to the token 102, according to one embodiment of the present disclosure. As described previously, the token receptacle 104 may therefore take advantage of the less space needed for its enclosure and can be configured to take up less space on the host device 101. Additionally, not including extensions on the token receptacle can reduce the need for repairs to the token receptacle 104. Thus, another advantage of the various embodiments of the present disclosure includes the reduction (or embedding) of the vulnerability of various portions of a token receptacle that are more susceptible to damage or breakage, since it may be more difficult to repair or replace a token receptacle that is attached or operably coupled with a host device than it is to repair or replace a portable token device.

Figure 4A:
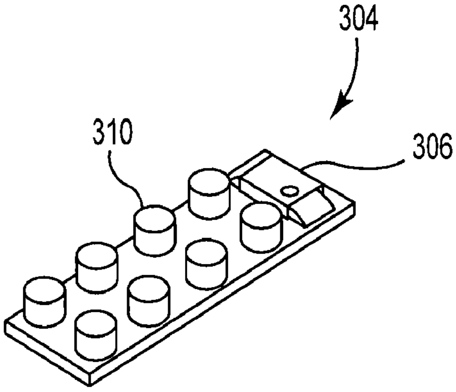
FIG. 4*a* is a perspective view of a printed circuit board (PCB) of a token in accordance with one embodiment of the present disclosure.
Figure 4B:
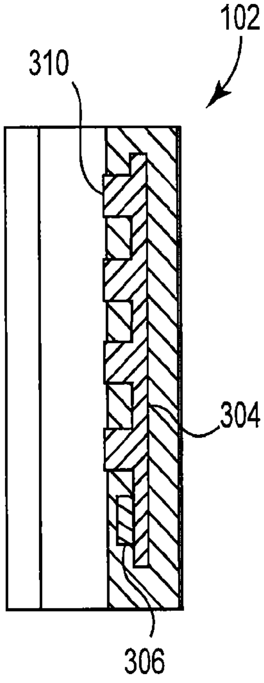
FIG. 4*b* is a cross-sectional view of a token in accordance with one embodiment of the present disclosure, taken along path AA of FIG. 3*a*.

As shown in FIGS. 4*a* and 4*b*, the token 102 may include an embedded printed circuit board ("PCB") 304, which may further contain electronic circuit elements 306, such as an integrated circuit or microelectronic chip disposed in and supported by the enclosure 302. Such electronic circuit elements 306 may comprise, but are not limited to, random access memory devices of EPROM (erasible programmable memory), ROM (read only memory), PROM (programmable read only memory) and/or EAROM (electrically alterable read only memory) and/or a magnetic domain memory, such as bubble memory, MRAM (magnetic random access memory), and/or FRAM (ferrous random access memory) depending upon the specific overall system design desired. In one embodiment, the circuit may be configured the same as a circuit in electronic token systems disclosed in prior patents, such as U.S. Pat. No. 4,578,573 mentioned above, which was previously incorporated herein by reference. For example, the token 102 may include a non-volatile, reprogrammable memory, for example, to store data transferred to and from the receptacle 104. In one embodiment, the PCB 304 may be molded over, with the material forming the enclosure 302 of the token or panel-mounted onto a portion of the enclosure 302, such that the PCB 304 is embedded within the enclosure 302. However, it is recognized that any suitable technique for embedding the PCB 304 within the enclosure 302 may be utilized.

On one side of the token 102, referred to herein as the contact surface 308, the token 102 comprises one or more electrically conductive contacts 310, arranged, preferably in a generally planar array, and configured such that when the token 102 is mated with the token receptacle 104, the contacts 310 generally align or electrically couple with contacts provided on the token receptacle 104. The contacts 310 are electrically coupled to the circuit 306 disposed within the enclosure 302. In one embodiment, the contacts 310 may be disposed within the enclosure such that generally only a top portion of the contacts 310 is exposed to an external environment. In other embodiments, any suitable amount of the contacts 310 may be exposed to the external environment. Since a portion of the contacts 310 will generally be exposed to an environment outside the token 102, the contacts 310 may be made from a rugged or long-lasting material, such as brass. The contacts 310 may be soldered onto, or otherwise electrically coupled to, the PCB 304.

As stated above, one advantage of the various embodiments of the present disclosure includes a reduced footprint size for the token receptacle 104. Because the token 102 is meant to operably couple with the token receptacle 104, the token 102 correspondingly includes a contact surface 308 configured, sized, and shaped to mate or couple with the token receptacle 104. As such, the contacts 310 may be arranged on the contact surface 308 of the token 102 in such a manner as to reduce or minimize the space consumed by the contacts as compared to tokens in previous data carrier systems. Specifically, the contacts 310 may be arranged in a generally dense-packed configuration that minimizes the surface area occupied by the planar array of contacts, consistent with sufficient electrical separation between adjacent contacts 310. The contacts 310 may be arranged in any suitable pattern, such as but not limited to, a rectangular or square pattern, circular or semi-circular pattern, polygonal pattern, staggered pattern, random pattern, etc. In one embodiment, the contacts 310 may be arranged such that the contacts 310 are spaced apart substantially as near as possible to each other while maintaining sufficient electrical separation, and in some embodiments, may be limited only by manufacturing process or material limitations, such as but not limited to, limitations in processes for plastic molding and/or PCB fabrication. Dense packing is discussed in detail, for example, in "Dense Packings of Congruent Circles in Rectangles with a Variable Aspect Ratio," Lubachevsky, Boris D. and Graham, Ronald, arXiv:math/0405148, May 2004, "Minimum Perimeter Rectangles That Enclose Congruent Non-Overlapping Circles," Lubachevsky, Boris D. and Graham, Ronald, arXiv:math/0412443, May 2008, and "Circle Packing," Weisstein, Eric W., MathWorld—A Wolfram Web Resource, http://mathworld.wolfram.com/CirclePacking.html, each of which is incorporated herein by reference in its entirety.

Figure 5A:
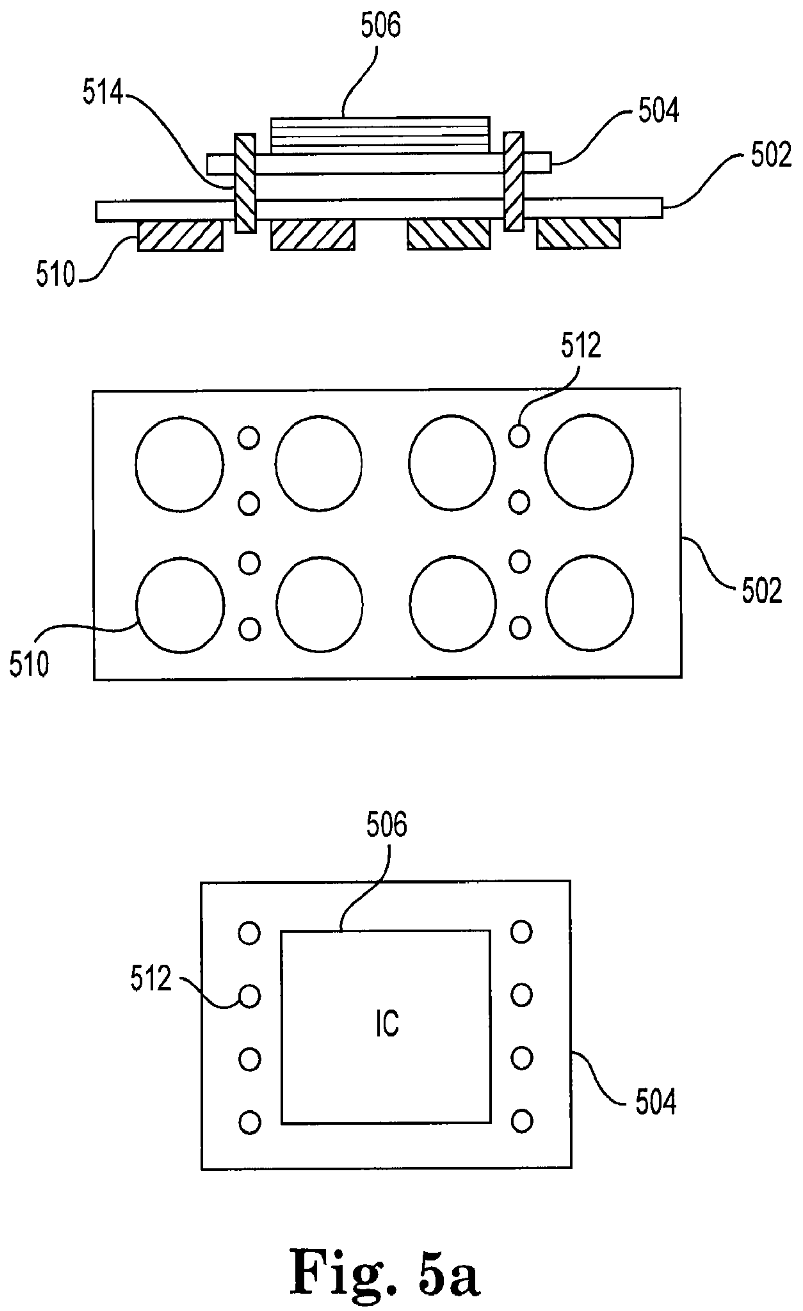
FIG. 5*a* includes several views of stacked PCBs of a token in accordance with one embodiment of the present disclosure.

The position of the circuit elements 306 illustrated in FIGS. 4*a* and 4*b* is not limiting, and is for illustration only. In other embodiments, the circuit elements 306 may be positioned in other suitable locations of the PCB 304 or provided on a separate PCB that is electrically coupled to the first PCB 304. For example, in one embodiment illustrated in FIG. 5*a*, two PCBs 502, 504 may be stacked or stake-pinned together and electrically coupled with one another. The PCB 502 may include the contacts 510, while the PCB 504 may include the circuit elements 506. However, in some embodiments, either PCB 502, 504 may include any suitable combination of contacts and circuit elements. The PCBs 502, 504 may each include one or more conductive support holes 512 for receiving or mating with respective conductive supports 514, and PCBs 502, 504 may be operably and electrically connected to one another via the conductive supports 514 and conductive support holes 512. In an embodiment such as the one illustrated in FIG. 5*a*, the length of the token 102 may thus be further reduced, due to the elimination of the extra length of the enclosure 302 required for housing a PCB 304 having circuit elements set off to one end of the PCB 304, as illustrated in FIGS. 3*a* and 4*a*. In some embodiments, because the height of the stacked PCBs 502, 504 may be more than that of the non-stacked PCB 304 of FIG. 4*a*, wherein the circuit elements are set off to one end, the height of the enclosure 302 of the token 102 may also be increased. Nonetheless, because the length of the token 102 is reduced, the length of the token receptacle 104 may correspondingly be reduced, thereby further reducing the overall size of the footprint of the token receptacle 104.

Figure 5B:
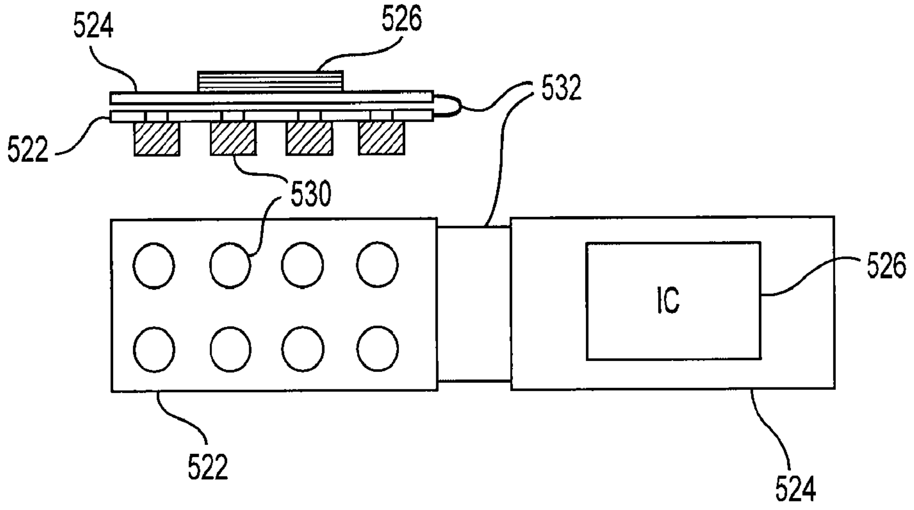
FIG. 5*b* includes a side view and plan view of a flexible PCB of a token in accordance with one embodiment of the present disclosure.

In another example embodiment, illustrated in FIG. 5*b*, a flex circuit may be used. A flex circuit may include two PCBs 522, 524 joined together and electrically coupled with one another via a flex cable 532 or flexible portion of the circuit. The PCB 522 may include the contacts 530, while the PCB 524 may include the circuit elements 526. However, in some embodiments, either PCB 522, 524 may include any suitable combination of contacts and circuit elements. The PCBs 522, 524 may be positioned in a generally stacked arrangement by folding the flex cable 532 over itself. Similar to the embodiment of FIG. 5*a*, in an embodiment such as the one illustrated in FIG. 5*b*, the length of the token 102 may thus be further reduced, due to the elimination of the extra length of the enclosure 302 required for housing a PCB 304 having circuit elements set off to one end of the PCB 304, as illustrated in FIGS. 3*a* and 4*a*. In some embodiments, because the height of the flex circuit PCBs 522, 524 may be more than that of the non-stacked PCB 304 of FIG. 4*a*, wherein the circuit elements are set off to one end, the height of the enclosure 302 of the token 102 may also be increased. Nonetheless, because the length of the token 102 is reduced, the length of the token receptacle 104 may correspondingly be reduced, thereby further reducing the overall size of the footprint of the token receptacle 104.

Figure 6A:
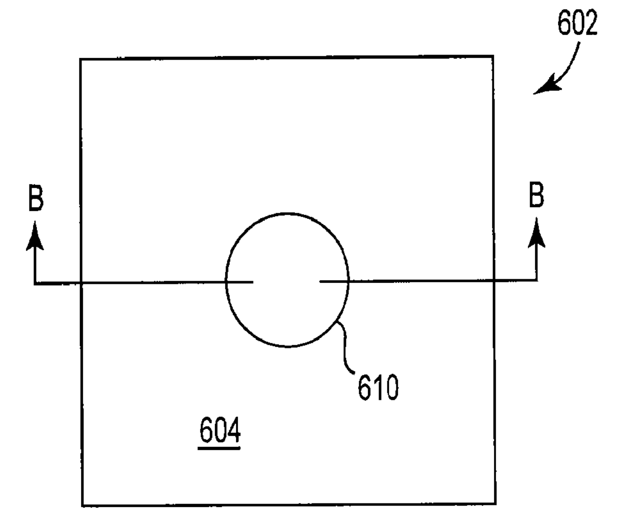
FIG. 6*a* is a plan view of a portion of a PCB of a token in accordance with one embodiment of the present disclosure.
Figure 6B:
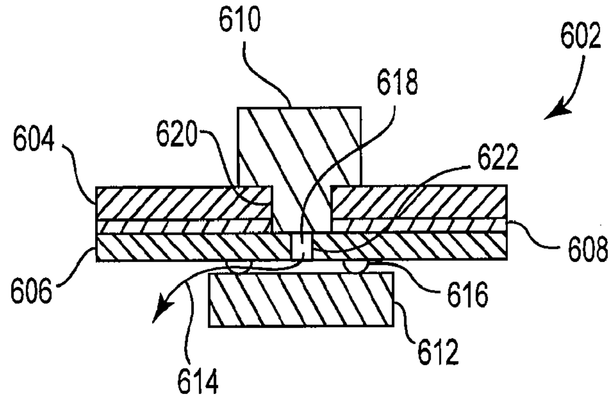
FIG. 6*b* is a cross-sectional view of a PCB of a token in accordance with one embodiment of the present disclosure, taken along path BB of FIG. 6*a*, and illustrating a "blind" via.

In another alternative embodiment of the token 102, a multilayer PCB 602 with vented "blind" vias, illustrated in FIGS. 6*a* and 6*b*, may be used to further compact or minimize the shape and size of the token 102, and thus correspondingly the footprint of the token receptacle 104. Vented blind vias can be used to increase the usable area of the PCB side opposite the contacts because they reduce or eliminate plated thru holes that would be desirably avoided when placing ICs on the side of the PCB opposite the contacts; the vents of a vented blind via are not plated and therefore do not provide the potential for creating a short circuit. FIGS. 6*a* and 6*b* show a first PCB layer 604 coupled with a second PCB layer 606 with a discretely depicted layer of lamination adhesive 608 between the two PCB layers 604, 606. A contact 610 is positioned within a plated-through bore 620 of PCB layer 604 and soldered to the PCB and plated bore. Note that a bore 622 of PCB layer 606 is a "via" and is not plated. Therefore, no solder flows down into this hole because there is no suitable material for molten solder to wet. While bore 622 could be any size, it can be appreciated that the smaller bore 622 is, the more space is available on the surface of PCB layer 606 for circuit elements and circuit traces. It is appreciated that any number of contacts may be provided, and only one contact is shown for ease of illustration. On the opposite side of multilayer PCB 602, circuit elements 612 may be soldered to PCB layer 606. As described above, however, in some embodiments, either PCB layer 604, 606 may include any suitable combination of contacts and circuit elements. In further embodiments, PCB layer 606 may be provided with a venting configuration, having a bore 622 and vent path 614, such that heated, trapped air 618 or gases (e.g., from the soldering process) behind the contact 610 may be released via the vent path 614. The effect of venting can be to prevent contact 610 from being raised into an undesired vertical position by the expanding air or gases during the soldering operation. In some embodiments, controlling the vertical position of the contact 610 relative to the PCB 602 can be critical to the success of the previously mentioned molding process wherein the PCB 602 is molded into a data carrier. In one embodiment, illustrated in FIG. 6*b*, the PCB 602 can include a ball grid array 616 for electrically coupling circuit elements 612 to PCB layer 606, thereby leaving space or a vent path 614 between circuit elements 612 and PCB layer 606 for trapped air to be released. As stated above, in such an embodiment, the length of the token 102 may thus be further reduced, due to the elimination of the extra length of the enclosure 302 required for housing a PCB 304 having circuit elements set off to one end of the PCB 304, as illustrated in FIGS. 3*a* and 4*a*. In some embodiments, because the height of the multilayer PCB 602 may be more than that of the single layer PCB 304 of FIG. 4*a*, the height of the enclosure 302 of the token 102 may also be increased. Nonetheless, because the length of the token 102 is reduced, the length of the token receptacle 104 may correspondingly be reduced, thereby further reducing the overall size of the footprint of the token receptacle 104. It is also appreciated that alternative PCB designs and configurations may be used to reduce the overall size or diameter of the token 102, including any combination of the example configurations discussed in detail above. It may also be appreciated that combining blind vias that are un-vented (e.g., where bore 622 does not exist) with precisely controlled dimensions and mass of the contact 610 can create a system where during a reflow soldering operation, any trapped gases in bore 620 bubble out, leaving a partial vacuum which would suck the contact down into a precise vertical position as the PCB 602 cools off after the soldering process.

Figure 7A:
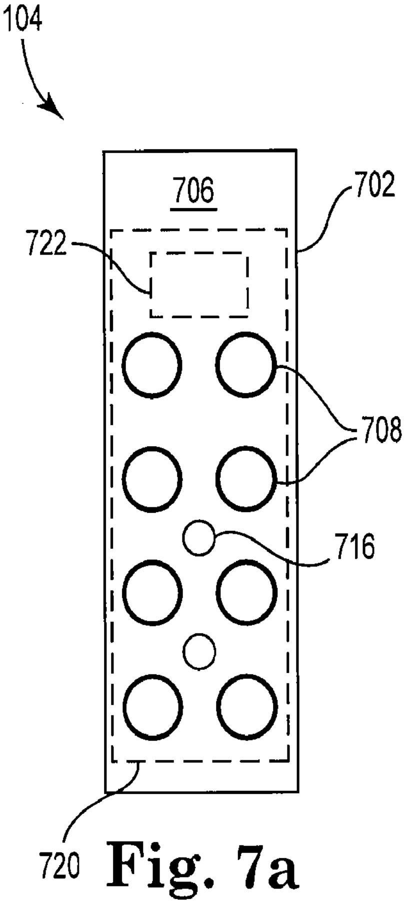
FIG. 7*a* is a plan view of a token receptacle in accordance with one embodiment of the present disclosure.
Figure 7B:
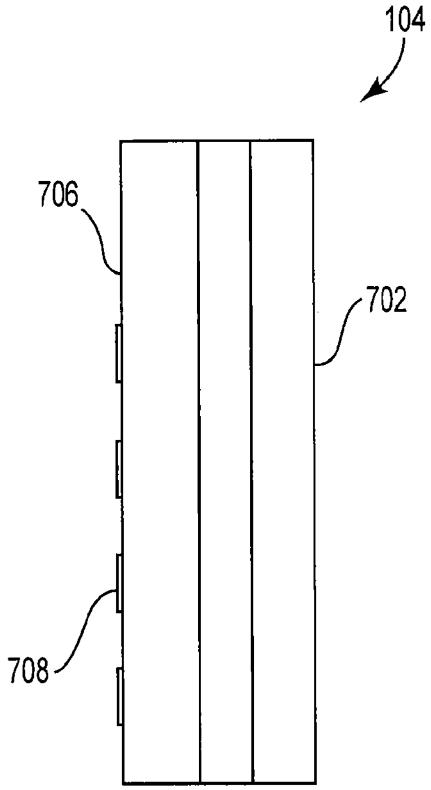
FIG. 7*b* is a side view of a token receptacle in accordance with one embodiment of the present disclosure.
Figure 7C:
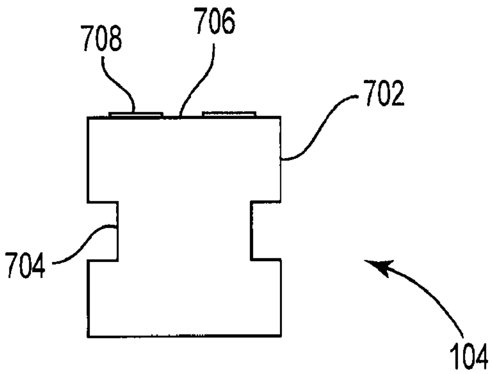
FIG. 7*c* is an end view of a token receptacle in accordance with one embodiment of the present disclosure.

Referring now to FIGS. 7*a*, 7*b*, and 7*c*, a receptacle 104 may comprise a generally nonconductive enclosure 702 (which may also be thought of and referred to herein as the "body" of the receptacle 104). The enclosure 702 may be made of any suitable material providing rigidity to the receptacle 104. In some embodiments, the enclosure 702 may be molded plastic for increased strength, durability, and overall ruggedness. The embodiment of a receptacle 104 illustrated in FIG. 7*c* is generally shaped similar to an I-beam, having a ledge or groove 704 on either side of the receptacle 104 for matingly receiving the coupling arms 314 of a token 102 and which may be provided for alignment and retention when the token 102 is operably coupled to the receptacle 104. That is, the configuration of the receptacle 104 may contain first alignment and/or first retention features, which mate with corresponding second alignment and/or second retention features of the token 102. In other embodiments, other coupling and retention means may be utilized, including but not limited to snap-on, bayonet, twist on, slide on, friction fit, or any other suitable coupling means. For example, token receptacle 104 may include magnetic coupling means, such as magnetized elements 716, in any suitable location for magnetically mating with corresponding magnetic coupling means (e.g., magnetized elements 316) provided on the token 102. As stated above, in a further embodiment, the magnet within the token enclosure 702 may include a moldable material impregnated with magnetic particles to form at least one domain of a first magnetic polarity, and the magnet within the token receptacle enclosure 302 may include a corresponding moldable material impregnated with magnetic particles to form at least one domain of a second magnetic polarity. Furthermore, the token receptacle 104 may be provided with any number or combination of alignment and/or retention features, and in some embodiments, the alignment and retention features may be the same physical component or feature, while in other embodiments, the alignment and retention features may be the separate physical components or features. It is appreciated that the receptacle 104 can be configured and arranged to have any suitable shape corresponding with the shape of a token 102, such that the receptacle 104 may removably receive and retain the token 102 in an operable position.

As described above, the token data carrier system 100 can be configured in such a manner to reduce and/or substantially minimize the footprint of the receptacle 104 on the host device. As such, many benefits and advantages, such as but not limited to the ones described herein, can be achieved using an electronic token data carrier system 100 according to the various embodiments of the present disclosure. Similarly, because the token receptacle 104 can be configured such that the token 102 is generally mounted onto, over, or at least partially surrounding the receptacle 104, the receptacle can be generally configured such that approximately only sufficient space for contacts may be provided, thereby reducing, and in some cases significantly reducing, the footprint size of the token receptacle 104. As stated above, space on a host device may be very valuable. Thus, one advantage of the various embodiments of the present disclosure includes a reduced footprint size for the token receptacle 104, which can be attached or operably coupled with the host device.

As shown in FIG. 7*a*, a token receptacle 104 may also include an embedded printed circuit board ("PCB") 720, which may further contain electronic circuit elements 722, such as an integrated circuit or microelectronic chip disposed in and supported by the enclosure 702. The PCB 720 may be configured and arranged to be mounted integrally with the enclosure 702. However, in one embodiment, a portion of the PCB 720 may be exposed on the underside of the enclosure 702. The PCB 720 may include electrical traces or pathways, a processor (e.g., a suitable CPU), and at least one embedded application (or other data processing logic), addressable I/O lines, and/or communication bus/interface, that are operable for data exchange with the token device 102. The CPU, addressable I/O lines, and electrical traces or pathways can be any suitable CPU, addressable I/O lines and/or communication bus/interface, and electrical wires known in the electrical and computer art. The at least one embedded application can be any type of user application, such as reader/writer modules, a transaction control program (e.g., for a purchase), etc., that are known in the electrical and computer art. In alternative embodiments, the token receptacle 104 may be operably connected to a controller having at least some of the electronic circuit elements 722, such as an integrated circuit.

On one side of the token receptacle 104, referred to herein as the contact surface 706, the receptacle 104 comprises one or more electrically conductive contacts 708, arranged, preferably in a generally planar array, and configured such that when the token 102 is mated with the token receptacle 104, the contacts 708 generally align or electrically couple with contacts 310 provided on the token 102. The contacts 708 are electrically coupled to the circuit disposed within the enclosure 702. In one embodiment, the contacts 708 may be disposed within the enclosure 702 such that generally only a top portion of the contacts 708 is exposed to an external environment. In other embodiments, any suitable amount of the contacts 708 may be exposed to the external environment. Since a portion of the contacts 708 will generally be exposed to an environment outside the token receptacle 104, the contacts 708 may be made from a rugged or long-lasting material, such as brass. The contacts 708 may be soldered onto, or otherwise electrically coupled to, the PCB 720. The contacts may be any suitable contacts, such as but not limited to spring-loaded probe contacts. Spring-loaded probe contacts may be overmolded and integrated into the enclosure 702 such that only a portion of the round tips of the plungers are exposed through channels of the token receptacle 104. Specifically, according to one embodiment, spring-loaded probe contacts may be overmolded and integrated into the enclosure 702.

As stated above, one advantage of the various embodiments of the present disclosure includes a reduced footprint size for the token receptacle 104. Correspondingly, the contacts 708 may be arranged on the contact surface 706 of the token receptacle 104 in such a manner as to reduce or minimize the space consumed by the contacts of token receptacles in previous data carrier systems. Specifically, the contacts 708 may be arranged in a generally dense-packed configuration that minimizes the surface area occupied by the planar array of contacts, consistent with sufficient electrical separation between adjacent contacts 708. The contacts 708 may be arranged in any suitable pattern, such as but not limited to, a rectangular or square pattern, circular or semi-circular pattern, polygonal pattern, staggered pattern, random pattern, etc. In one embodiment, the contacts 708 may be arranged such that the contacts 708 are spaced apart substantially as near as possible to each other while maintaining sufficient electrical separation, and in some embodiments, may be limited only by manufacturing process or material limitations, such as but not limited to, limitations in processes for plastic molding and/or PCB fabrication.

In some embodiments, the token receptacle 104 may include an interface for interfacing an external host device or operation system. The host device may have its own interface connector. The interface can be coupled or integrated to the token receptacle 104 and electrically connected to the PCB 720 of the receptacle 104 via wires, electric cords, a flex circuit, or other equivalent interconnection means. However, in alternative embodiments, the interface may be disposed substantially within the enclosure 702 and/or electrically connected directly to the PCB 720.

The token receptacle 104 can be configured to be permanently or removably attached to any suitable external device, such as any suitable device associated with, for example, secure communications products to encrypt governmental communications/information that may be transferred, data logging applications for transport of data to/from a remote station, access control to electronic systems or to facilities, carrying a cash value (e.g., cashless vending), and crypto-ignition keys, or CIKs.

Figure 8:
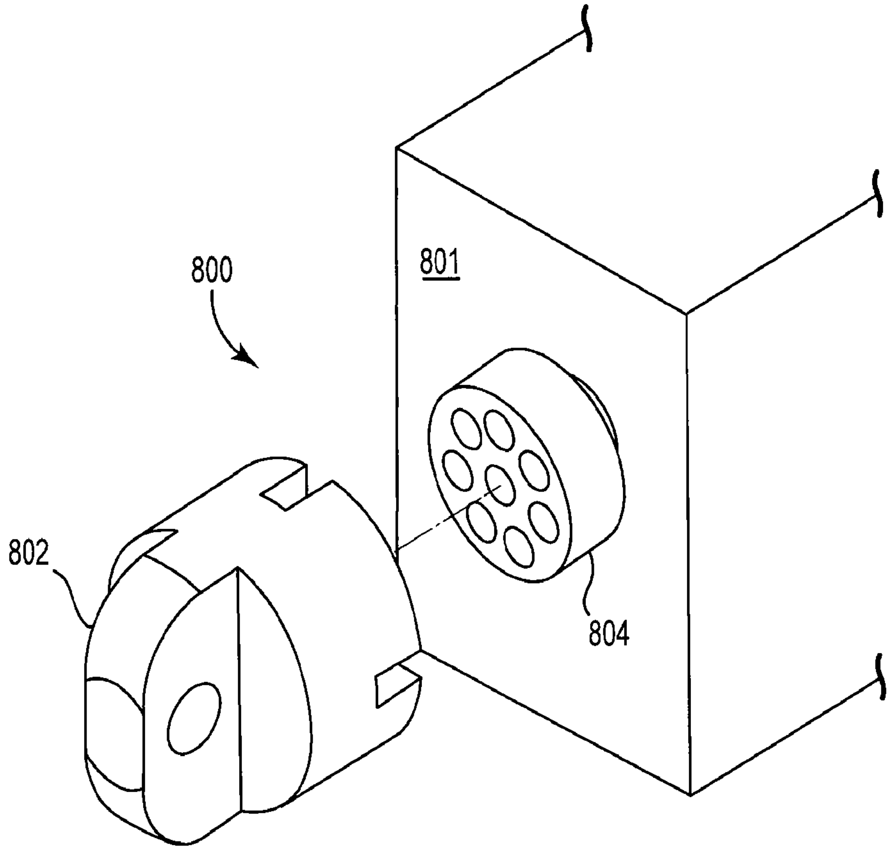
FIG. 8 is a perspective view of an electronic token data carrier system in accordance with another embodiment of the present disclosure, wherein the token is operably detached from the token receptacle.

FIG. 8 illustrates another example embodiment of an electronic token data carrier system 800 according to the principles of the present disclosure. The electronic token data carrier system 800 may include substantially similar elements as the system 100 illustrated in FIGS. 1*a* and 1*b* and may operate in a substantially similar manner. Specifically, an electronic token data carrier system 800 may include an electronic data carrier, token, or token-like device 802 and a token receptacle 804. As illustrated in FIG. 8, the system 800 may generally be circular or cylindrical in shape, and have a cap-like token 802. The token 802 can be portable and may be operably and removably coupled with the token receptacle 804. The token receptacle 804 may be operably coupled or integrated with a host device 801, and when token 802 is coupled with token receptacle 804, the token data carrier system 800 may be operable, in a plurality of access modes, to allow access to the host device 801 depending on a level of access allowance granted to the token 802. The token data carrier system 800 can be configured, as will be described in further detail, in such a manner to reduce and/or substantially minimize the footprint of the token receptacle 804 on the host device 801. The system 800 may include a variety of electronic token system configurations, including but not limited to on-mount, over-mount, snap-on, bayonet, twist on, slide on, friction fit, or any other suitable configuration in accordance with the various embodiments of the present disclosure.

When the token 802 is operably coupled to the receptacle 804, the token 802, or portions of the token 802, may at least partially surround or cover at least a portion of the receptacle 804, such that the token 802 is generally mounted onto, over, or surrounding the receptacle 804. As such, many benefits and advantages, such as but not limited to the ones previously described herein, can be achieved using an electronic token data carrier system 800 according to the various embodiments of the present disclosure. Particularly, in one embodiment, the token receptacle 804 may be configured to take up less space, or real estate, on or in an attached host device 801. For example, because the token receptacle can be configured such that the token 802 is generally mounted onto, over, or surrounding the receptacle 804, the receptacle can be generally configured such that approximately only sufficient space for contacts may be provided, thereby reducing, and in some cases significantly reducing, the footprint size of the token receptacle 804. As stated above, space on a host device may be very valuable. Thus, one advantage of the various embodiments of the present disclosure includes a reduced footprint size for the token receptacle 804, which can be attached or operably coupled with the host device.

Figure 9A:
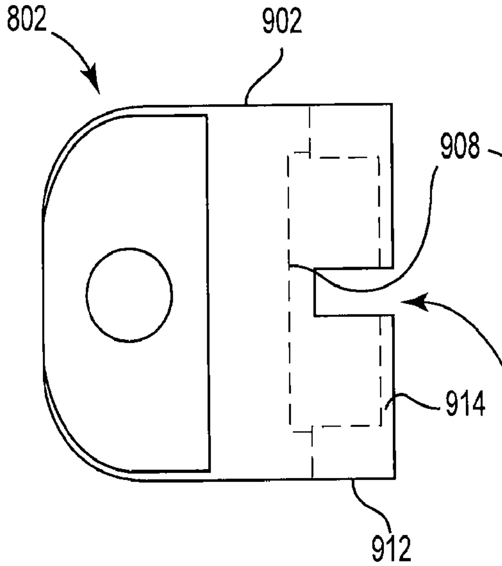
FIG. 9*a* is a side view of a token in accordance with the embodiment of FIG. 8.
Figure 9B:
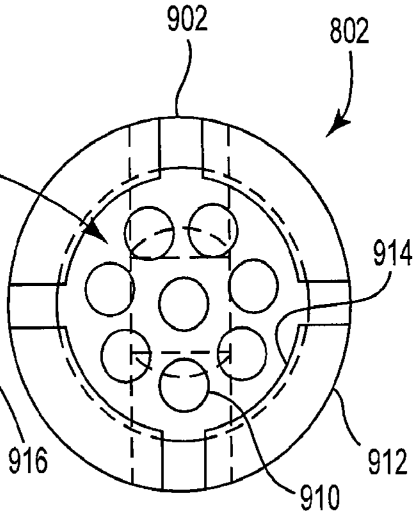
FIG. 9*b* is a plan view of a token in accordance with the embodiment of FIG. 8.

As can be seen in detail in FIGS. 9*a* and 9*b*, a portable token device 802 may include substantially similar elements as the token device 102 illustrated in FIGS. 3*a* and 3*b* and may operate in a substantially similar manner. Particularly, a token device 802 may comprise a generally nonconductive enclosure 902 (which may also be thought of and referred to herein as the "body" of the token device 802). The enclosure 902 may be made of any suitable material providing rigidity to the token 802. In some embodiments, the enclosure 902 may be molded plastic for increased strength, durability, and overall ruggedness. The embodiment of a token 802 illustrated in FIGS. 9*a* and 9*b* is generally cylindrical, having one or more extensions 912, arms, wings, etc., extending from the peripheral edge of the token 802. Extensions 912 may each include a coupling arm 914 for reception by a mating coupling ledge or groove provided on the receptacle 804, which may be provided for alignment and retention when the token 802 is operably coupled to the receptacle 804. That is, the configuration of the receptacle 804 may contain first alignment and/or first retention features, which mate with corresponding second alignment and/or second retention features of the token 802. In other embodiments, any suitable coupling and retention means may be utilized, including but not limited to snap-on, bayonet, twist on, slide on, friction fit, or any other suitable coupling means. For example, token 802 may include magnetic coupling means similar to that described above with respect to token device 102. Furthermore, the token 802 may be provided with any number or combination of alignment and/or retention features, and in some embodiments, the alignment and retention features may be the same physical component or feature, while in other embodiments, the alignment and retention features may be the separate physical components or features. While, the enclosure 902 may be made of any suitable material providing rigidity to the token 802, in some embodiments, the level of rigidity may be selected such that the extensions 912, coupling arms 914, and/or other retention or alignment features have sufficient flexibility or deformability to allow the token 802, and specifically the extensions 912, coupling arms 914, and/or other retention or alignment features, to flex and allow the token 802 to mount onto, over, or at least partially surround the receptacle 804 and flex back to a normal position to allow the extensions 912, coupling arms 914, and/or other retention or alignment features to mate with corresponding retention or alignment features on the token receptacle 804. It is appreciated that the token 802 can be configured and arranged for many different uses, such as a user access device, an administrative key, a data transfer device, or any combination of uses, etc.

At least the same benefits and advantages as described above with respect to electronic token data carrier system 100 can be achieved using an electronic token data carrier system 800. Thus, another advantage of the system 800 includes the reduction (or embedding) of the vulnerability of various portions of a token receptacle that are more susceptible to damage or breakage, since it may be more difficult to repair or replace a token receptacle that is attached or operably coupled with a host device than it is to repair or replace a portable token device.

The token 802 may include an embedded printed circuit board ("PCB") that may include substantially similar elements as the PCB 304 illustrated in FIGS. 4*a* and 4*b* and may operate in a substantially similar manner. Particularly, the PCB may contain electronic circuit elements, such as an integrated circuit or microelectronic chip disposed in and supported by the enclosure 902. Such electronic circuit elements may comprise random access memory devices of EPROM (erasible programmable memory), ROM (read only memory), PROM (programmable read only memory) and/or EAROM (electrically alterable read only memory) and/or a magnetic domain memory, such as bubble memory, MRAM (magnetic random access memory), and/or FRAM (ferrous random access memory) depending upon the specific overall system design desired. In one embodiment, the circuit may be configured the same as a circuit in electronic token systems disclosed in prior patents, such as U.S. Pat. No. 4,578,573 mentioned above, which was previously incorporated herein by reference. For example, the token 802 may include a non-volatile, reprogrammable memory, for example, to store data transferred to and from the receptacle 804. In one embodiment, the PCB may be molded over with the material forming the enclosure 902 of the token or panel-mounted onto a portion of the enclosure, such that the PCB is embedded within the enclosure 902. However, it is recognized that any suitable technique for embedding the PCB within the enclosure 902 may be utilized.

Figure 10:
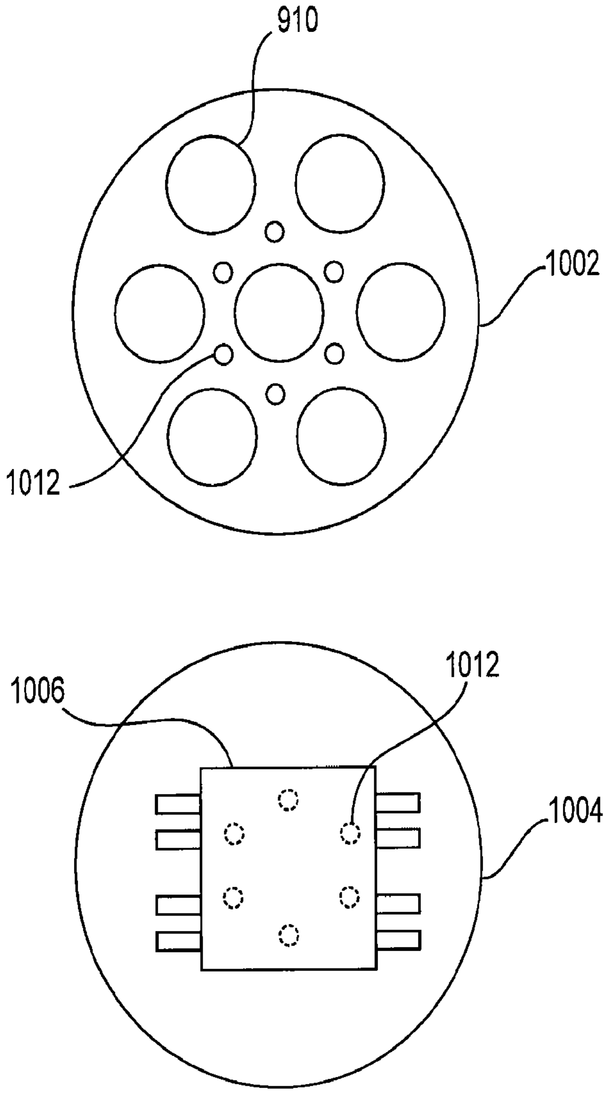
FIG. 10 includes a top plan view and bottom plan view of stacked PCBs of a token in accordance with the embodiment of FIG. 8.

As stated above with respect to the token 102, the circuit elements of the PCB in the token 802 may be positioned in any suitable location of the PCB or provided on a separate PCB that is electrically coupled to the first PCB. For example, in one embodiment illustrated in FIG. 10, two PCBs 1002, 1004 may be stacked or stake-pinned together and electrically coupled with one another. The PCB 1002 may include the contacts 910, while the PCB 1004 may include the circuit elements 1006. However, in some embodiments, either PCB 1002, 1004 may include any suitable combination of contacts and circuit elements. The PCBs 1002, 1004 may each include one or more conductive support holes 1012 for receiving or mating with respective conductive supports, and PCBs 1002, 1004 may be operably and electrically connected to one another via the conductive supports and conductive support holes 1012. In an embodiment such as the one illustrated in FIG. 10, the diameter of the token 802 may be further reduced, due to the elimination of the extra diameter of the enclosure required for housing a PCB having circuit elements set off to one end of the PCB. In some embodiments, because the height of the stacked PCBs 1002, 1004 may be more than that of a non-stacked PCB wherein the circuit elements are set off to one end, the height of the enclosure 902 of the token 802 may also be increased. Nonetheless, because the diameter of the token 802 is reduced, the diameter of the token receptacle 804 may correspondingly be reduced, thereby further reducing the overall size of the footprint of the token receptacle 804. It is also appreciated that alternative PCB designs and configurations may be used to reduce the overall size or diameter of the token 802, including the example configurations discussed in detail above, such as the use of a flex circuit, a multilayer PCB with vented "blind" vias, or any combination of suitable configurations.

On one side of the token 802, referred to herein as the contact surface 908, the token 802 comprises one or more electrically conductive contacts 910, arranged, preferably in a generally planar array, and configured such that when the token 802 is mated with the token receptacle 804, the contacts 910 generally align or electrically couple with contacts provided on the token receptacle 804. The contacts 910 are electrically coupled to the circuit disposed within the enclosure 902. In one embodiment, the contacts 910 may be disposed within the enclosure such that generally only a top portion of the contacts 910 is exposed to an external environment. In other embodiments, any suitable amount of the contacts 910 may be exposed to the external environment. Since a portion of the contacts 910 will generally be exposed to an environment outside the token 802, the contacts 910 may be made from a rugged or long-lasting material, such as brass. The contacts 910 may be soldered onto, or otherwise electrically coupled to, the PCB.

As stated above, one advantage of the various embodiments of the present disclosure includes a reduced footprint size for the token receptacle 804. Because the token 802 is meant to operably couple with the token receptacle 804, the token 802 correspondingly includes a contact surface 908 configured, sized, and shaped to mate or couple with the token receptacle 804. As such, the contacts 910 may be arranged on the contact surface 908 of the token 804 in such a manner as to reduce or minimize the space consumed by the contacts as compared to tokens in previous data carrier systems. Specifically, the contacts 910 may be arranged in a generally dense-packed configuration that minimizes the surface area occupied by the planar array of contacts, consistent with sufficient electrical separation between adjacent contacts 910. The contacts 910 are illustrated in FIG. 9*b* in a generally circular pattern. However, the contacts 910 may be arranged in any suitable pattern, such as but not limited to, a rectangular or square pattern, circular or semi-circular pattern, polygonal pattern, staggered pattern, random pattern, etc. In one embodiment, the contacts 910 may be arranged such that the contacts 910 are spaced apart substantially as near as possible to each other while maintaining sufficient electrical separation, and in some embodiments, may be limited only by manufacturing process or material limitations, such as but not limited to, limitations in processes for plastic molding and/or PCB fabrication.

Figure 11A:
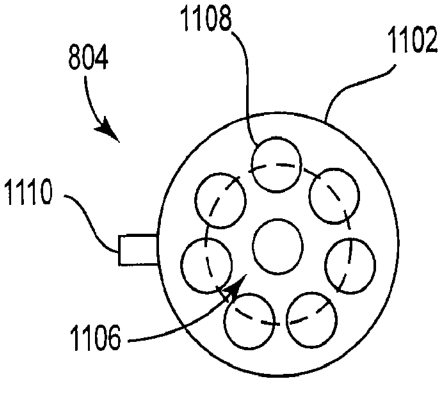
FIG. 11*a* is a plan view of a token receptacle in accordance with the embodiment of FIG. 8, also including an optional orientation feature.
Figure 11B:
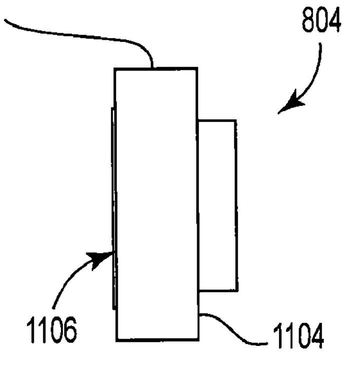
FIG. 11*b* is a side view of a token receptacle in accordance with the embodiment of FIG. 8.

Referring now to FIGS. 11*a* and 11*b*, a receptacle 804 may include substantially similar elements as the token receptacle 104 illustrated in FIGS. 7*a*, 7*b*, and 7*c* and may operate in a substantially similar manner. Particularly, a token receptacle 804 may comprise a generally nonconductive enclosure 1102 (which may also be thought of and referred to herein as the "body" of the receptacle 804). The enclosure 1102 may be made of any suitable material providing rigidity to the receptacle 804. In some embodiments, the enclosure 1102 may be molded plastic for increased strength, durability, and overall ruggedness. The embodiment of a receptacle 804 illustrated in FIGS. 11*a* and 11*b* is generally cylindrical, having a ledge or groove 1104 on either side of the receptacle 104 for matingly receiving the coupling arms 914 of a token 802 and which may be provided for alignment and retention when the token 802 is operably coupled to the receptacle 804. In other embodiments, other coupling and retention means may be utilized, including but not limited to snap-on, bayonet, twist on, slide on, friction fit, or any other suitable coupling means. For example, token receptacle 804 may include magnetic coupling means, similar to that described above with respect to token receptacle 104. In another example embodiment, as shown in FIG. 11*a*, the token receptacle 804 may be provided with one or more orientation posts 1110, which may be used in conjunction with corresponding one or more orientation spaces 916 (FIG. 9) of the token 802 to correctly align the token 802 with the token receptacle 804. Furthermore, the token 802 may be provided with any number or combination of alignment and/or retention features, and in some embodiments, the alignment and retention features may be the same physical component or feature, while in other embodiments, the alignment and retention features may be the separate physical components or features. It is appreciated that the receptacle 804 can be configured and arranged to have any suitable shape corresponding with the shape of a token 802, such that the receptacle 804 may removably receive and retain the token 802 in an operable position.

As described above with respect to the token data carrier system 100, the token data carrier system 800 can be configured in such a manner to reduce and/or substantially minimize the footprint of the receptacle 804 on the host device. As such, many benefits and advantages, such as but not limited to the ones described herein, can be achieved using an electronic token data carrier system 800. Similarly, because the token receptacle 804 can be configured such that the token 802 is generally mounted onto, over, or at least partially surrounding the receptacle 804, the receptacle can be generally configured such that approximately only sufficient space for contacts may be provided, thereby reducing, and in some cases significantly reducing, the footprint size of the token receptacle 804. As stated above, space on a host device may be very valuable. Thus, one advantage of the various embodiments of the present disclosure includes a reduced footprint size for the token receptacle 804, which can be attached or operably coupled with the host device.

A token receptacle 804 also includes an embedded printed circuit board ("PCB") that may include substantially similar elements as the PCB 720 illustrated in FIG. 7*a* and may operate in a substantially similar manner. Particularly the PCB may further contain electronic circuit elements, such as an integrated circuit or microelectronic chip disposed in and supported by the enclosure 1102. The PCB may be configured and arranged to be mounted integrally with the enclosure 1102. However, in one embodiment, a portion of the PCB may be exposed on the underside of the enclosure 1102. The PCB may include electrical traces or pathways, a processor (e.g., a suitable CPU), and at least one embedded application (or other data processing logic), addressable I/O lines, and/or communication bus/interface, that are operable for data exchange with the token device 802. The CPU, addressable I/O lines, and electrical traces or pathways can be any suitable CPU, addressable I/O lines and/or communication bus/interface, and electrical wires known in the electrical and computer art. The at least one embedded application can be any type of user application, such as reader/writer modules, a transaction control program (e.g., for a purchase), etc., that are known in the electrical and computer art.

On one side of the token receptacle 804, referred to herein as the contact surface 1106, the receptacle 804 comprises one or more electrically conductive contacts 1108, arranged, preferably in a generally planar array, and configured such that when the token 802 is mated with the token receptacle 804, the contacts 1108 generally align or electrically couple with contacts 910 provided on the token 802. The contacts 1108 are electrically coupled to the circuit disposed within the enclosure 1102. In one embodiment, the contacts 1108 may be disposed within the enclosure 1102 such that generally only a top portion of the contacts 1108 is exposed to an external environment. In other embodiments, any suitable amount of the contacts 1108 may be exposed to the external environment. Since a portion of the contacts 1108 will generally be exposed to an environment outside the token receptacle 804, the contacts 1108 may be made from a generally rugged or long-lasting material, such as brass. The contacts 1108 may be soldered onto, or otherwise electrically coupled to, the PCB. The contacts may be any suitable contacts, such as but not limited to spring-loaded probe contacts. Spring-loaded probe contacts may be overmolded and integrated into the enclosure 1102 such that only a portion of the round tips of the plungers are exposed through channels of the token receptacle 804. Specifically, according to one embodiment, spring-loaded probe contacts may be overmolded and integrated into the enclosure 1102.

As stated above with respect to the token receptacle 104, one advantage of the various embodiments of the present disclosure includes a reduced footprint size for the token receptacle 804. Correspondingly, the contacts 1108 may be arranged on the contact surface 1106 of the token receptacle 804 in such a manner as to reduce or minimize the space consumed by the contacts of token receptacles in previous data carrier systems. Specifically, the contacts 1108 may be arranged in a generally dense-packed configuration that minimizes the surface area occupied by the planar array of contacts, consistent with sufficient electrical separation between adjacent contacts 1108. The contacts 1108 are illustrated in FIG. 11 a in a generally circular pattern. However, the contacts 1108 may be arranged in any suitable pattern, such as but not limited to, a rectangular or square pattern, circular or semi-circular pattern, polygonal pattern, staggered pattern, random pattern, etc. In one embodiment, the contacts 1108 may be arranged such that the contacts 1108 are spaced apart substantially as near as possible to each other while maintaining sufficient electrical separation, and in some embodiments, may be limited only by manufacturing process or material limitations, such as but not limited to, limitations in processes for plastic molding and/or PCB fabrication.

In some embodiments, the token receptacle 804 may include an interface for interfacing an external host device or operation system. The host device may have its own interface connector. The interface can be coupled or integrated to the token receptacle 804 and electrically connected to the PCB of the receptacle 804 via wires, electric cords, a flex circuit, or other equivalent interconnection means. However, in alternative embodiments, the interface may be disposed substantially within the enclosure 1102 and/or electrically connected directly to the PCB.

The token receptacle 804 can be configured to be permanently or removably attached to any suitable external device, such as any suitable device associated with, for example, secure communications products to encrypt governmental communications/information that may be transferred, data logging applications for transport of data to/from a remote station, access control to electronic systems or to facilities, carrying a cash value (e.g., cashless vending), and crypto-ignition keys, or CIKs.

Although the present invention has been described with reference to preferred embodiments, persons skilled in the art will recognize that changes may be made in form and detail without departing from the spirit and scope of the invention. For example, it is recognized that the present disclosure is not limited to the specific embodiments illustrated herein, and the principles of the disclosure are applicable to electronic token data carrier system having many other suitable shapes, configurations, and dimensions. Additionally, while a certain number of contacts have been illustrated for the embodiments disclosed herein, it is recognized that any suitable number of contacts may be used and may depend on the expected use and specifications for the data carrier system.

We claim:

1. An electronic token system for interfacing to a host device comprising:

a token receptacle operable to couple with the host device, said token receptacle comprising:

a receptacle body with a volume and an outer surface, said outer surface having a first, generally planar array of electrical contacts mounted thereon, said contacts arranged in a dense-packed configuration that minimizes the surface area occupied by the planar array, consistent with sufficient electrical separation between adjacent contacts; and a first alignment feature and a first retention feature within the volume of the receptacle body; and a portable token comprising:

an enclosure for enclosing at least a portion of the receptacle body, said enclosure having a second alignment feature operable to mate in engagement with the first alignment feature and a second retention feature operable to hold the portable token in removable connection with the first retention feature of the token receptacle;

a second, generally planar array of electrical contacts mounted in the portable token operable to electronically communicate with the corresponding electrical contacts of the first planar array mounted in the token receptacle when the first and second alignment features and the first and second arrays are in respective mating engagement; and an electrical component activated by the engagement of the token with the token receptacle, with conductors operable to electrically connect the electrical component to the second, generally planar array of electrical contacts mounted in the portable token, the electrical component being mounted within the enclosure and displaced either laterally or vertically or both from the second planar array.

2. The electronic token system of claim 1, wherein at least one of the first alignment feature and the first retention feature is concave with respect to the volume of the receptacle body for receiving and mating with a corresponding one of the second alignment feature or second retention feature of the portable token.

3. The electronic token system of claim 1, wherein at least one of the first alignment feature and the first retention feature is a magnet within the volume of the receptacle body for interacting with a corresponding second alignment feature or second retention feature of the portable token, being a magnet pole with opposite polarity to a corresponding one of the first alignment or retention feature.

4. The electronic token system of claim 3, wherein the magnet within the volume of the receptacle body comprises a moldable material impregnated with magnetic particles to form at least one domain of a first magnetic polarity and the magnet within the portable token comprises a moldable material impregnated with magnetic particles to form at least one domain of a second magnetic polarity.

5. The electronic token system of claim 1, wherein the electrical contacts are configured in a shape selected from the group consisting of rectangles, circles, hexagons, and higher order polygons.

6. The electronic token system of claim 1, wherein the token receptacle extends from the host device with a generally rectangular body and the token has a receiver enclosure that matingly fits over the generally rectangular body.

7. The electronic token system of claim 1, wherein the token receptacle extends from the device with a generally cylindrical body and the token has a receiver enclosure that matingly fits over the generally cylindrical body.

8. The electronic token system of claim 1, wherein the electrical component comprises a data exchange circuit.

9. The electronic token system of claim 1, wherein the first alignment feature and the first retention feature comprise the same physical component.

10. The electronic token system of claim 1, wherein the second alignment feature and the second retention feature comprise the same physical component.

11. The electronic token system of claim 1, wherein the second, generally planar array of electrical contacts and the electrical component of the portable token are provided on a printed circuit board having vented blind vias.

12. The electronic token system of claim 1, wherein the second, generally planar array of electrical contacts and the electrical component of the portable token are provided on a printed circuit board having un-vented blind vias, which after a soldering operation for coupling at least one of the second, generally planar array of electrical contacts to the printed circuit board using the blind vias, create a vacuum that would suck the at least one contacts down into position as the printed circuit board cools off.

13. A portable electronic token for use with a control system for interfacing to a host device, the token comprising:

- an enclosure operable to enclose at least a portion of a token receptacle of the control system operable to couple the portable token with the host device, said token receptacle comprising:
  - a receptacle body with a volume and an outer surface, said outer surface having a first, generally planar array of electrical contacts mounted thereon, said contacts arranged in a dense-packed configuration that minimizes the surface area occupied by the planar array, consistent with sufficient electrical separation between adjacent contacts; and
  - a first alignment feature and a first retention feature within the volume of the receptacle body;
- wherein said enclosure comprises a second alignment feature operable to mate in engagement with the first alignment feature and a second retention feature operable to hold the portable token in removable connection with the first retention feature of the token receptacle;
- a second, generally planar array of electrical contacts mounted in the portable token operable to electronically communicate with the corresponding electrical contacts of the first planar array mounted in the token receptacle when the first and second alignment features and the first and second arrays are in respective mating engagement; and
- an electrical component activated by the engagement of the token with the token receptacle, with conductors operable to electronically connect the electrical component to the second, generally planar array of electrical contacts mounted in the portable token, the electrical component being mounted within the enclosure and displaced either laterally or vertically or both from the second planar array.

14. The portable electronic token of claim 13, wherein the electrical contacts are configured in a shape selected from the group consisting of rectangles, circles, hexagons, and higher order polygons.

15. The portable electronic token of claim 13, wherein the token receptacle extends from the host device with a generally rectangular body and the token has a receiver enclosure that matingly fits over the generally rectangular body.

16. The portable electronic token of claim 13, wherein the token receptacle extends from the device with a generally cylindrical body and the token has a receiver enclosure that matingly fits over the generally cylindrical body.

17. The portable electronic token of claim 13, wherein the second alignment feature and the second retention feature comprise the same physical component.

18. The portable electronic token of claim 13, wherein the second, generally planar array of electrical contacts and the electrical component of the portable token are provided on a printed circuit board having vented blind vias.

19. The portable electronic token of claim 13, wherein the second, generally planar array of electrical contacts and the electrical component of the portable token are provided on a printed circuit board having un-vented blind vias, which after a soldering operation for coupling at least one of the second, generally planar array of electrical contacts to the printed circuit board using the blind vias, create a vacuum that would suck the at least one contacts down into position as the printed circuit board cools off.

20. The portable electronic token of claim 13, wherein the second, generally planar array of electrical contacts and the electrical component of the portable token are provided separate printed circuit boards that are stacked.

21. The portable electronic token of claim 13, wherein the second, generally planar array of electrical contacts and the electrical component of the portable token are provided on a flex circuit.

22. A method of interfacing to a host device through using an electronic token system comprising:

- operably coupling a portable electronic token comprising:
  - an enclosure having a first alignment feature and a first retention feature;
  - a first, generally planar array of electrical contacts mounted within the enclosure of the portable token and exposed inside the enclosure; and
  - an electrical component with conductors for electrically connecting the electrical component to the first, generally planar array of electrical contacts mounted in the portable token, the electrical component being mounted within the enclosure and displaced either laterally or vertically or both from the first planar array;

with a token receptacle operably coupled with the host device comprising:

a receptacle body with a volume and an outer surface, said outer surface having a second, generally planar array of electrical contacts mounted thereon, said contacts arranged in a dense-packed configuration that minimizes the surface area occupied by the planar array, consistent with sufficient electrical separation between adjacent contacts; and a second alignment feature and a second retention feature within the volume of the receptacle body;

such that:

the enclosure of the portable token encloses at least a portion of the receptacle body, with the first alignment feature matingly engaging with the second alignment feature and the first retention feature holding the portable token in removable connection with the second retention feature of the token receptacle;

the first, generally planar array of electrical contacts mounted within are in mating electrical engagement with the corresponding electrical contacts of the second, generally planar array of electrical contacts mounted in the token receptacle; and the electrical component is activated by engagement of the token with the token receptacle.

* * * * *